United States Patent
Chaganti et al.

(10) Patent No.: US 10,764,135 B2
(45) Date of Patent: Sep. 1, 2020

(54) METHOD AND SYSTEM FOR SOLUTION INTEGRATION LABELING

(71) Applicant: Dell Products L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/261,285

(22) Filed: Jan. 29, 2019

(65) Prior Publication Data
US 2020/0244526 A1 Jul. 30, 2020

(51) Int. Cl.
*G06F 9/50* (2006.01)
*H04L 12/24* (2006.01)

(52) U.S. Cl.
CPC ........ *H04L 41/0816* (2013.01); *G06F 9/5011* (2013.01); *G06F 9/5027* (2013.01); *G06F 9/5061* (2013.01); *G06F 9/5072* (2013.01); *G06F 9/5077* (2013.01); *H04L 41/0823* (2013.01); *H04L 41/22* (2013.01)

(58) Field of Classification Search
CPC . H04L 41/0816; H04L 41/0823; H04L 41/22; H04L 41/0893; G06F 9/5011; G06F 9/5077; G06F 9/5027; G06F 9/5061; G06F 9/5072; G06F 9/4881; G06F 9/50; G06F 9/541; G06F 3/0659; G06F 16/289; G06F 16/9038; G06Q 10/10; H04N 21/63345
See application file for complete search history.

(56) References Cited

U.S. PATENT DOCUMENTS

| | | |
|---|---|---|
| 7,987,353 B2 | 7/2011 | Holdaway et al. |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |

(Continued)

OTHER PUBLICATIONS

"Make more time for the work that matters most", retrieved on-line Mar. 4, 2019 at https://asana.com/ (5 pages).

(Continued)

*Primary Examiner* — Le H Luu
(74) *Attorney, Agent, or Firm* — Chamberlain, Hrdlicka, White, Williams & Aughtry

(57) ABSTRACT

A method and system for solution integration labeling. Specifically, the method and system disclosed herein enable the dynamic generation of recommended integration options for solution infrastructures based on component system and host network configurations. These recommended integration options may be presented visually, alongside compliant or non-compliant indicators, to validate the deployment of, and interconnectivities between, solution infrastructure components.

20 Claims, 12 Drawing Sheets

(56) References Cited

U.S. PATENT DOCUMENTS

| | | |
|---|---|---|
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,339,455 B1 | 7/2019 | Parush-tzur |
| 10,409,778 B1 | 9/2019 | Zhao et al. |
| 10,503,413 B1 * | 12/2019 | Gal ..................... G06F 3/0659 |
| 2003/0058277 A1 * | 3/2003 | Bowman-Amuah ........................ G06F 16/289 715/765 |
| 2003/0172145 A1 * | 9/2003 | Nguyen ................ G06Q 10/10 709/223 |
| 2003/0177205 A1 | 9/2003 | Liang et al. |
| 2005/0076049 A1 | 4/2005 | Qubti et al. |
| 2008/0244204 A1 | 10/2008 | Cremelie et al. |
| 2009/0077165 A1 | 3/2009 | Rhodes et al. |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0161000 A1 | 6/2015 | Kim et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 * | 4/2017 | Dale ................... H04L 41/0893 |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 * | 3/2018 | Beveridge ................. G06F 9/50 |
| 2018/0157532 A1 * | 6/2018 | Kumar .................. G06F 9/4881 |
| 2018/0189109 A1 * | 7/2018 | Nagai ....................... G06F 9/50 |
| 2018/0278597 A1 * | 9/2018 | Helms .............. H04N 21/63345 |
| 2018/0307560 A1 | 10/2018 | Vishnumolakala et al. |
| 2018/0322558 A1 * | 11/2018 | Padmanabh ............ G06F 9/541 |
| 2019/0104398 A1 | 4/2019 | Owen et al. |
| 2019/0109772 A1 * | 4/2019 | Lipstone ............. H04L 41/0893 |
| 2019/0197023 A1 | 6/2019 | Chennamsetty et al. |
| 2019/0379588 A1 | 12/2019 | Rao |
| 2020/0050689 A1 * | 2/2020 | Tal .......................... G06F 16/23 |

OTHER PUBLICATIONS

"Project Management Redefined", retrieved on-line Mar. 4, 2019 at https://www.robohead.net/features-2/ (2 pages).

"Features" Project Management Tools, retrieved on-line Mar. 4, 2019 at https://www.proworkflow.com/features-project-management-tools/ (7 pages).

Suzhen Wu et al.; "Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028) (10 pages).

* cited by examiner

METHOD AND SYSTEM FOR SOLUTION INTEGRATION LABELING

BACKGROUND

Once a datacenter infrastructure is provisioned and put into operations, it is important to visualize and understand how the host operating system (OS) configuration is implemented to ensure that the configuration is uniform (for various critical parameters) across the infrastructure.

DETAILED DESCRIPTION

Figure 1A:
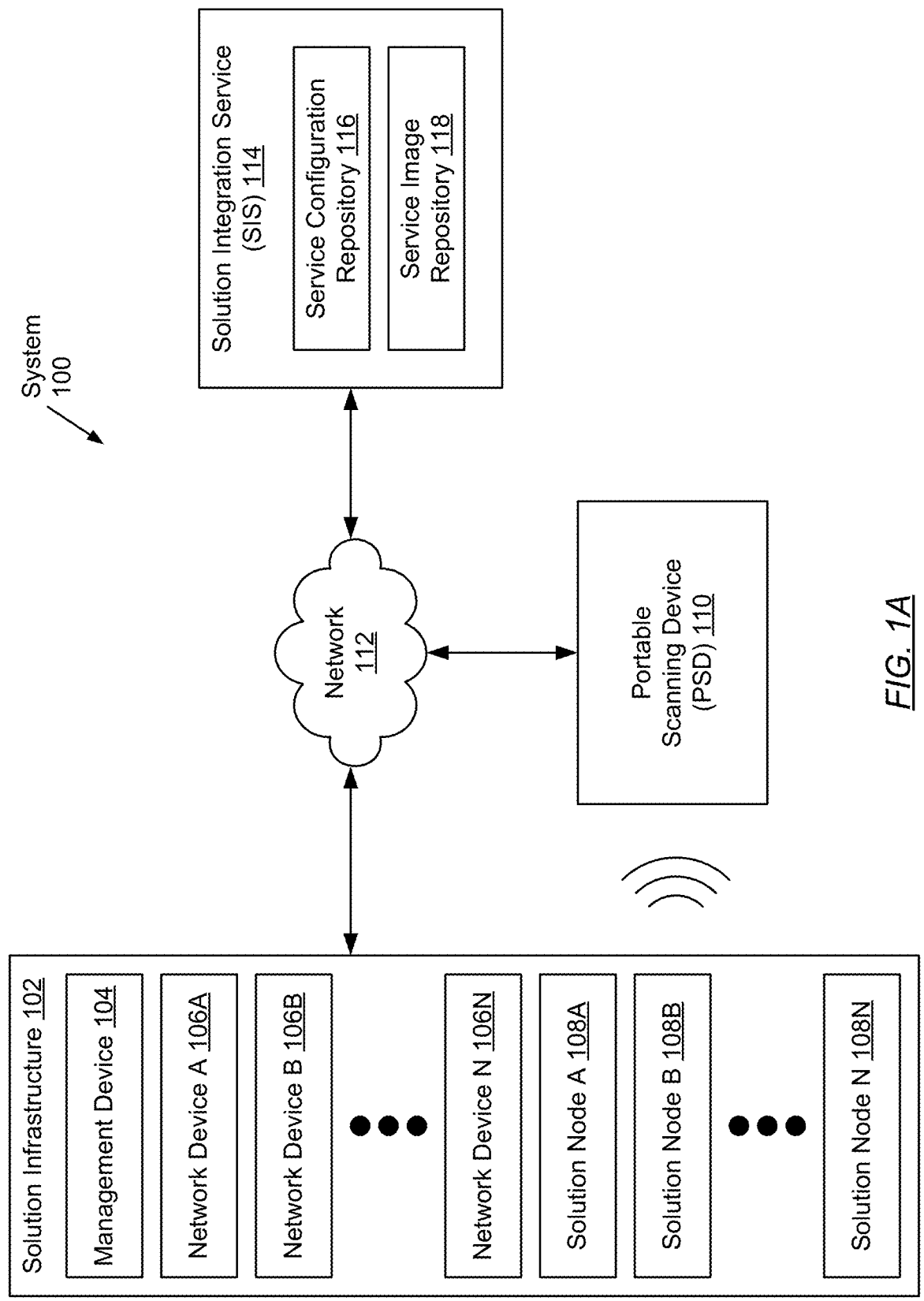
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and system for solution integration labeling. Specifically, one or more embodiments of the invention enable the dynamic generation of recommended integration options for solution infrastructures based on component system and host network configurations. These recommended integration options may be presented visually, alongside compliant or non-compliant indicators, to validate the deployment of, and interconnectivities between, solution infrastructure components.

FIG. 1A shows a system in accordance with one or more embodiments of the invention. The system (100) may include a solution infrastructure (102), a portable scanning device (PSD) (110), and a solution integration service (SIS) (114). Each of these components is described below.

In one embodiment of the invention, the above-mentioned components may be directly or indirectly connected to one another through a network (112) (e.g., a local area network (LAN), a wide area network (WAN) such as the Internet, a mobile network, etc.). The network (112) may be implemented using any combination of wired and/or wireless connections. In embodiments in which the above-mentioned components are indirectly connected, there may be other networking components or systems (e.g., switches, routers, gateways, etc.) that may facilitate communications, information exchange, and/or resource sharing. Further, the above-mentioned components may interact with one another using any combination of wired and/or wireless communication protocols.

In one embodiment of the invention, the solution infrastructure (102) may represent a collection of datacenter components—e.g., hardware, software, firmware, and/or any combination thereof—that may be integrated, to achieve desired workloads or purposes. Desirable workloads may, for example, entail large-scale and complex data processing. Further, the aforementioned collection of datacenter components may include, but is not limited to, a management device (104), one or more network devices (106A-106N), and one or more solution nodes (108A-108N). Each of these subcomponents is described below.

In one embodiment of the invention, the management device (104) may represent a physical computing system that enables access and control of the various solution infrastructure (102) subcomponents when the production network (e.g., the in-band network) is unavailable. To that extent, the management device (104) may include functionality to facilitate communication and interaction between end devices (e.g., the network device(s) (106A-106N), the solution node(s) (108A-108N), the PSD (110), etc.) through an out-of-band network (not shown). Subsequently, the management device (104) may also be referred to as an out-of-band management (OOBM) device. Further, the management device (104) may include, but is not limited to, all or any subset of the following: persistent storage, memory (e.g., random access memory (RAM)), one or more computer processors, and two or more physical network interfaces (which may also be referred to as ports). Moreover, the management device (104) may be connected to other devices—e.g., other solution infrastructure (102) subcomponents, the PSD (110), etc.—through wired (e.g., using the network interfaces) and/or wireless connections.

In one embodiment of the invention, a network device (106A-106N) may represent a physical computing system that facilitates communication and interaction between end devices (e.g., the solution node(s) (108A-108N), the PSD (110), the SIS (114), etc.) operatively connected through an in-band network (e.g., the network (112)). To that extent, in general, a network device (106A-106N) may include functionality to receive network traffic (e.g., protocol data units (PDUs)) through network interfaces or ports, and determine whether to: (a) drop the network traffic; (b) process the network traffic in accordance with a configuration of the network device (106A-106N); and/or (c) send the network traffic, based on the processing, out through other network interfaces or ports. Further, a network device (106A-106N) may include, but is not limited to, all or any subset of the following: persistent storage, memory (e.g., random access memory (RAM)), one or more computer processors, one or more network chips, and two or more physical network interfaces (which may also be referred to as ports). Moreover, a network device (106A-106N) may be connected to other devices—e.g., other solution infrastructure (102) subcomponents, the PSD (110), etc.—through wired (e.g., using the network interfaces) and/or wireless connections.

In one embodiment of the invention, how a network device (106A-106N) processes network traffic may depend, at least in part, on whether the network device (106A-106N) operates as a layer-2 (L2) switch or a layer-3 (L3) switch (also referred to as a multilayer switch), which may perform at least some functions of a router. If a network device (106A-106N) operates as a L2 switch, the network device (106A-106N) may use a destination media access control (MAC) address along with one or more forwarding data structures and/or policies to determine out of which network interface or port to send the network traffic towards a next hop (e.g., another network device) or destination (e.g., an endpoint). Alternatively, if the network device (106A-106N) operates as a L3 switch, the network device (106A-106N) may use a destination Internet Protocol (IP) address along with one or more routing data structures and/or policies to determine out of which network interface or port to send the network traffic towards a next hop or destination. Furthermore, if the network device (106A-106N) operates as a multilayer switch, the network device (106A-106N) may include functionality to process network traffic using both MAC addresses and IP addresses.

In one embodiment of the invention, a solution node (108A-108N) may represent a physical computing system provisioned to provide one or more datacenter resources (e.g., computing, memory, persistent and non-persistent storage, network bandwidth, virtualization, etc.). These datacenter resources may be allocated towards supporting the desired workloads for which, collectively, the solution infrastructure (102) is purposed. By way of examples, a solution node (108A-108N) may be a bare-metal server (i.e., a single-tenant server) with or without an operating system (OS) installed thereon, or any other computing system similar to the exemplary computing system shown in FIG. 5.

In one embodiment of the invention, the PSD (110) may represent a mobile, physical computing system that includes wireless scanning (e.g., near-field communications (NFC)) capabilities. Accordingly, the PSD (110) may include functionality to exchange information with other devices (e.g., the solution node(s) (108A-108N)) through wireless communications. Further, the PSD (110) may be connected to other devices—e.g., the management device (104), the SIS (114), etc.—through connections that employ other wireless technologies (e.g., wireless Ethernet). One of ordinary skill will appreciate that the PSD (110) may perform other functionalities without departing from the scope of the invention. Examples of the PSD (110) may include, but are not limited to, a tablet computer, a smartphone, or any other mobile computing system similar to the exemplary computing system shown in FIG. 5. Moreover, the PSD (110) is described in further detail below with respect to FIG. 1B.

In one embodiment of the invention, the SIS (114) may represent a support backend for a solution integration labeling feature (described below) executing on the PSD (110). The SIS (114) may be implemented on one or more servers (not shown). Each server may be a physical server (i.e., within a datacenter) or a virtual server (i.e., residing in a cloud computing environment). Additionally or alternatively, the SIS (114) may be implemented on one or more computing systems similar to the exemplary computing system shown in FIG. 5. Furthermore, to the extent of fulfilling a supportive role for the aforementioned solution integration labeling feature, the SIS (114) may include a service configuration repository (116) and a service image repository (118). Each of these subcomponents is described below.

In one embodiment of the invention, the service configuration repository (116) may represent data storage wherein different compliance and configuration combinations for validating various solution integrations (described below) may be consolidated. The service configuration repository (116) may be implemented using one or more physical storage devices and/or media. The one or more physical storage devices and/or media may or may not be of the same type. Further, the different compliance and configuration combinations for validating the various solution integrations, consolidated in the service configuration repository (116), may be arranged by way of any storage mechanism (e.g., a filesystem, a collection of tables or records, etc.). In one embodiment of the invention, the service configuration repository (116) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The service configuration repository (116) is described in further detail below with respect to FIG. 2A.

In one embodiment of the invention, the service image repository (118) may represent data storage wherein various image alternatives for visualizing various solution integrations may be consolidated. The service image repository (118) may be implemented using one or more physical storage devices and/or media. The one or more physical storage devices and/or media may or may not be of the same type. Further, the various image alternatives for visualizing the various solution integrations, consolidated in the service image repository (118), may be arranged by way of any storage mechanism (e.g., a filesystem, a collection of tables or records, etc.). In one embodiment of the invention, the service image repository (118) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The service image repository (118) is described in further detail below with respect to FIG. 2B.

While FIG. 1A shows a configuration of components, other system configurations may be used without departing from the scope of the invention. For example, the solution infrastructure (102) may include multiple management devices (104).

Figure 1B:
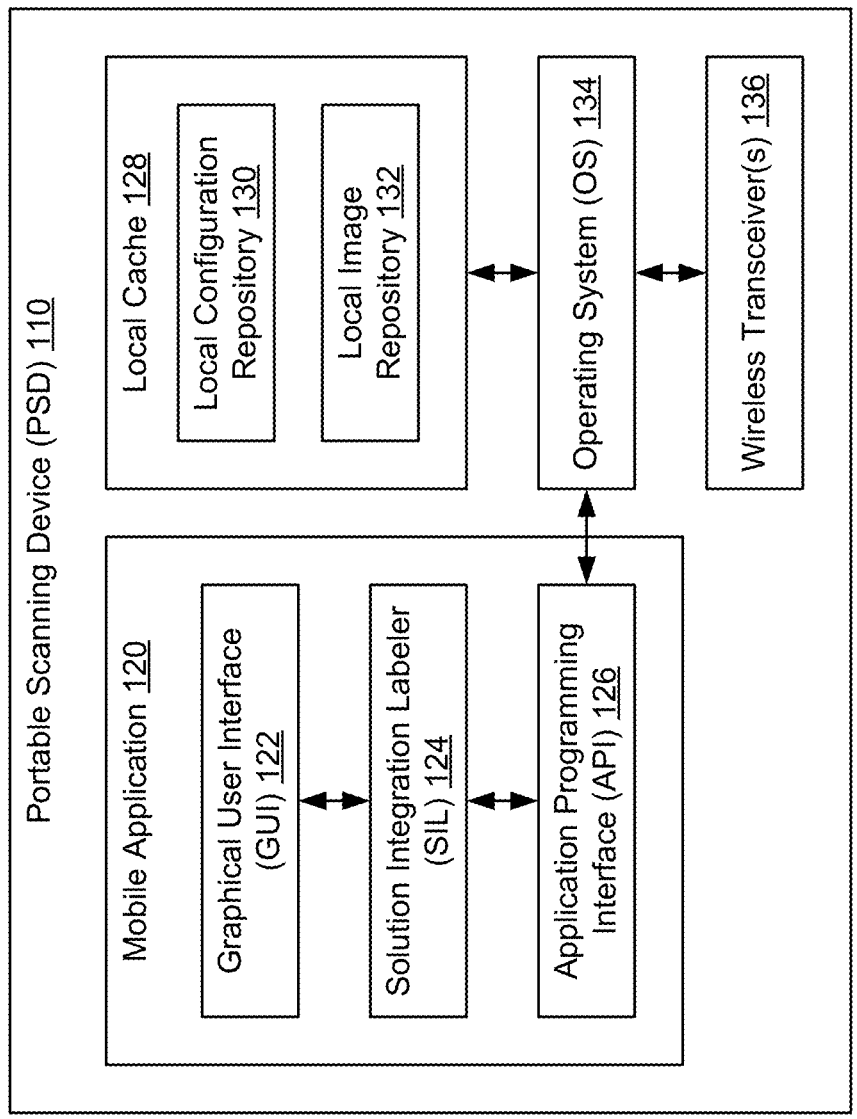
FIG. 1B shows a portable scanning device in accordance with one or more embodiments of the invention.

FIG. 1B shows a portable scanning device (PSD) in accordance with one or more embodiments of the invention. The PSD (110) may represent a mobile, physical computing system that at least includes a mobile application (120) executing thereon, a local cache (128), an operating system (OS) also executing thereon, and one or more wireless transceiver(s) (136). Each of these components is described below.

In one embodiment of the invention, the mobile application (120) may represent a computer program specifically designed and implemented to run on the underlying hardware (e.g., computer processor(s) (not shown)) of a mobile device—e.g., the PSD (110). The mobile application (120) may serve as a tool for monitoring and managing the various datacenter components of an infrastructure solution (102) (see e.g., FIG. 1A). More specifically, the mobile application (120) may enable administrators, of the infrastructure solution (102), to perform various tasks pertinent to datacenter operations. Furthermore, the mobile application (120) may include, but is not limited to, a graphical user interface (122), a solution integration labeler (SIL) (124), and an application programming interface (API) (126). Each of these subcomponents is described below.

In one embodiment of the invention, the GUI (122) may represent an interface through which information pertinent to the mobile application (120) may be presented to, and/or inputs may be acquired from, a user of the PSD (110). The GUI (122) may convey information, to the user, on a display device integrated into the PSD (110), such as a conventional, non-touch-enabled screen or a touchscreen. Further, the GUI (122) may include various GUI widgets that may organize what information is disclosed to the user, as well as how the information may be presented. Moreover, the GUI (122) may include functionality to display information to the user through text, images, videos, any other form of digitally-representable visual media, or any combination thereof. If the GUI (122) is presented through a touchscreen, the GUI (122) may also include functionality to display information inputted by the user, which may be detected by the touchscreen itself or any other form of input device (e.g., keyboard, stylus, camera, scanner, etc.) (not shown) integrated into the PSD (110).

In one embodiment of the invention, the SIL (124) may represent a computer process (i.e., an instance of a computer program) that may enable and implement a solution integration labeling feature available on the mobile application (120). Substantively, the solution integration labeling feature may enable the dynamic generation of recommended integration options for solution infrastructures based on system and host network configurations. These recommended integration options may be presented visually, alongside compliant or non-compliant indicators, to validate the deployment of, and interconnectivities between, solution infrastructure components. To that extent, the SIL (124) may include functionality to perform any subset or all of the various steps directed to solution integration labeling outlined below with respect to FIGS. 4A-4D.

In one embodiment of the invention, the API (126) may represent a hardware and/or software implemented construct that employs a set of subroutine definitions, protocols, and/or tools for enabling interactions between the mobile application (120) and the OS (134) (described below) also executing on the PSD (110). The API (126) may include functionality to: issue system calls, on behalf of other mobile application (120) subcomponents (e.g., the SIL (124)), to the OS (134) which may be directed to some interaction with other PSD (110) components outside the mobile application (120) (e.g., the local cache (128) and the wireless transceivers (136)); and receive call responses from the OS (134) and relayed to the requesting mobile application (120) subcomponent, where the call responses may include feedback pertaining to an earlier issued system call. One of ordinary skill will appreciate that the API (126) may perform other functionalities without departing from the scope of the invention.

Returning to the other components of the PSD (110), in one embodiment of the invention, the local cache (128) may represent persistent cache available on the PSD (110). Persistent cache may refer to a hybrid technology, which boasts the high-speed data accessibility associated with memory (e.g., random access memory (RAM)) and the persist storage of data associated with disk media. Subsequently, the local cache (128) may be implemented using one or more physical storage devices and/or media, which may encompass persistent (i.e., non-volatile) storage. Examples of persistent storage may include, but are not limited to: optical storage, magnetic storage, NAND Flash Memory, NOR Flash Memory, Magnetic RAM (M-RAM), Spin Torque Magnetic RAM (ST-MRAM), Phase Change Memory (PCM), or any other storage defined as non-volatile Storage Class Memory (SCM).

In one embodiment of the invention, the local cache (128) may support a local configuration repository (130), which may represent data storage wherein different compliance and configuration combinations for validating various solution integrations may be consolidated. These different compliance and configuration combinations for validating various solution integrations may be arranged, within the local configuration repository (130), by way of any storage mechanism (e.g., a filesystem, a collection of tables or records, etc.). Further, the local configuration repository (130) may store at least a subset of the like information stored in the service configuration repository (116) on the solution integration service (SIS) (114) (see e.g., FIG. 1A). Moreover, the local configuration repository (130) may be updated, on demand or periodically, using and from the like information consolidated in the service configuration repository (116). The local configuration repository (130) is described in further detail below with respect to FIG. 2A.

In one embodiment of the invention, the local cache (128) may further support a local image repository (132), which may represent data storage wherein various image alternatives for visualizing various solution integrations may be consolidated. These various image alternatives for visualizing various solution integrations may be arranged, within the local image repository (132), by way of any storage mechanism (e.g., a filesystem, a collection of tables or records, etc.). Further, the local image repository (132) may store at least a subset of the like information stored in the service image repository (118) on the SIS (114) (see e.g., FIG. 1A). Moreover, the local image repository (132) may be updated, on demand or periodically, using and from the like information consolidated in the service image repository (118).

The local image repository (132) is described in further detail below with respect to FIG. 2B.

In one embodiment of the invention, the OS (134) may represent a kernel computer program that may execute on the underlying hardware (e.g., computer processor(s) (not shown)) of the PSD (110). Specifically, the OS (134) may represent a kernel computer program, which may be tasked with managing the underlying hardware (e.g., wireless transceivers (136), storage devices (e.g., local cache (128)), etc.), and the other logical or software components (e.g., mobile application (120)) executing on the PSD (110), as well as facilitating the interactions between the various hardware and software components. The OS (134) may include functionality to interact with other logical/software components using system calls, and with hardware through the use of respective drivers. Further, the OS (134) may also include functionality to, for example, support fundamental PSD (110) operations, schedule tasks, and allocate PSD (110) resources. One of ordinary skill will appreciate that the OS (134) may perform other functionalities without departing from the scope of the invention.

In one embodiment of the invention, a wireless transceiver (136) may represent a physical, communication-enabling device that may include a receiver antenna, for receiving information, and a transmitter antenna for transmitting information. A wireless transceiver (136) may receive and/or transmit information wirelessly (i.e., without a wired medium) through a wireless link that may operatively connect the PSD (110) to one or more external entities (e.g., the solution infrastructure (102) and the SIS (114) (see e.g., FIG. 1A)). Further, a wireless transceiver (136) may include functionality to: obtain outgoing information from the OS (134); modulate the outgoing information onto a carrier wave tuned to a desired wireless frequency band, to obtain a modulated carrier wave; transmit the modulated carrier wave to another wireless transceiver or receiver (not shown) on one or more external entities; receive another modulated carrier wave tuned to the desired wireless frequency band from one or external entities; demodulate the received modulated carrier wave, to extract incoming information; and provide the extracted incoming information to the OS (134). Examples of wireless connectivity protocols that may be employed by the wireless transceiver(s) (136) to receive and/or transmit information may include, but are not limited to, Bluetooth, Bluetooth Low Energy (BLE), Wi-Fi, ZigBee, Long Term Evolution (LTE), Near Field Communication (NFC), Radio Frequency Identification (RFID), Wireless Highway Addressable Remote Transducer (WirelessHART), Wireless Universal Serial Bus (WirelessUSB), Wireless Local Area Network (WLAN), etc.

Figure 2A:
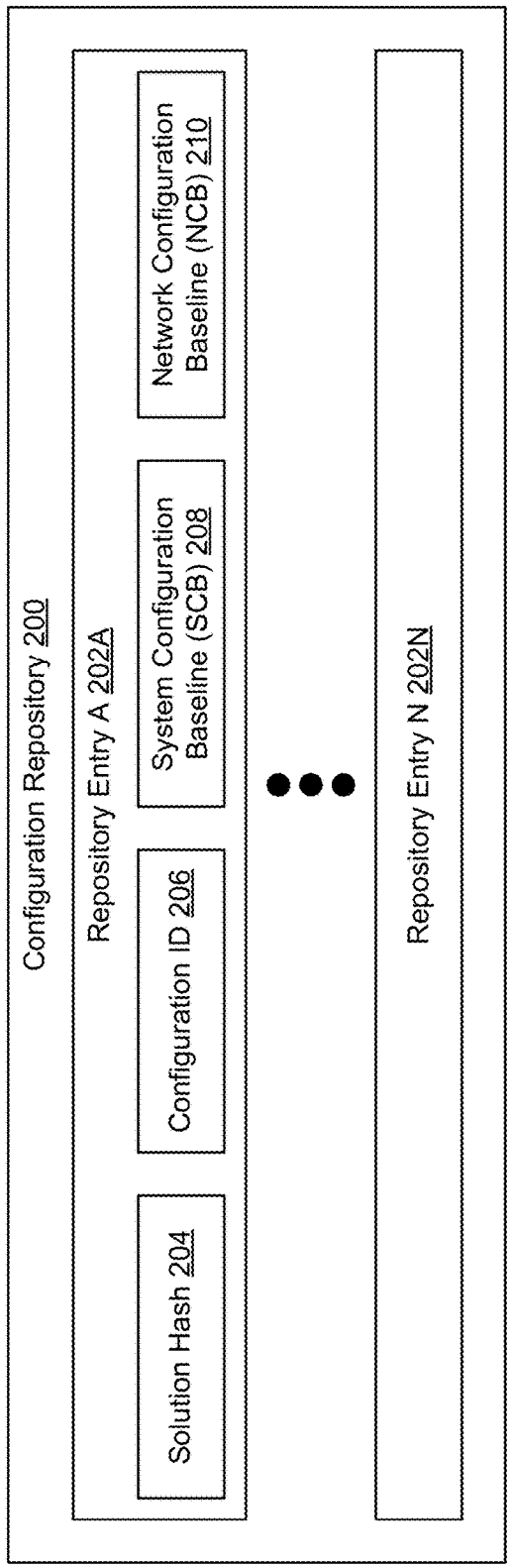
FIG. 2A shows a configuration repository in accordance with one or more embodiments of the invention.

FIG. 2A shows a configuration repository in accordance with one or more embodiments of the invention. The portrayed configuration repository (200) may reference the service configuration repository residing on the solution integration service (SIS) (see e.g., FIG. 1A) or the local configuration repository residing in local cache on the portable scanning device (PSD) (see e.g., FIG. 1B). Further, as mentioned above, a configuration repository (200) may represent data storage wherein different compliance and configuration combinations for validating various solution integrations may be consolidated.

In one embodiment of the invention, a configuration repository (200) may index information stored therein, for example, by way of one or more repository entries (202A-202N). Each repository entry (202A-202N) may consolidate pertinent compliance and configuration identification information relevant to a unique solution integration and user-desired host network configuration combination. A solution integration may refer to a specialized subset of subcomponents integrated into each of the various datacenter components (e.g., management device, network device(s), and solution node(s)) that form a solution infrastructure (see e.g., FIG. 1A). These specialized subcomponents pertain to hardware, software, firmware, and/or any combination thereof, which particularly enable the various interconnectivities between the various datacenter components. For example, these specialized subcomponents may include, but are not limited to, physical devices (e.g., network interface cards (NICs), network adapters, etc.) that facilitate communications amongst these networked datacenter components, as well as the software and/or firmware that may implement and support the functionality of these aforementioned physical devices.

Meanwhile, in one embodiment of the invention, a user-desired host network configuration may refer to a connectivity architecture, sought to be implemented by administrators of a solution infrastructure, that reflects or maps the interconnectivities between the various datacenter components (or more specifically, between the above-mentioned specialized subcomponents). This connectivity architecture may also reflect the management and deployment complexity, sought to be implemented by the aforementioned administrators, for the solution infrastructure. By way of an example, the user-desired host network configuration may be directed to a traditional (i.e., non-converged) connectivity architecture. Under this connectivity architecture, the various datacenter components are maintained as individual entities—meaning each component may be configured and managed separately. By way of another example, the user-desired host network configuration may alternatively be directed to a converged connectivity architecture. Under this connectivity architecture, at least a subset of the various datacenter components may be combined through virtualization, and subsequently, configured and managed together using a centralized platform.

In view of the above, in one embodiment of the invention, each repository entry (202A-202N) of a configuration repository (200) may include, but is not limited to, a solution hash (204), a configuration identifier (ID) (206), a system configuration baseline (SCB) (208), and a network configuration baseline (NCB) (210). Each of these data objects is described below.

In one embodiment of the invention, the solution hash (204) may refer to a deterministic, fixed-length character string that may be generated by a hashing function. Specifically, the solution hash (204) may uniquely identify a combination of information—i.e., metadata representative of a unique solution integration and user-desired host network configuration combination. Further, a hashing function may refer to a data association algorithm that maps a given input of any arbitrary length to a given output (e.g., the solution hash (204)) from a range of possible outputs. The input used in the generation of the solution hash (204) may encompass an inventory hash (described below) representative of metadata describing a solution integration, and metadata describing a user-desired host network configuration (described above).

In one embodiment of the invention, the configuration ID (206) may refer to an arbitrary-length character string assigned by administrators of a solution integration service (SIS) (see e.g., FIG. 1A). Specifically, the configuration ID (206) may uniquely identify a given solution integration and user-desired host network configuration combination, which may define or characterize a given solution infrastructure.

Figure 2B:
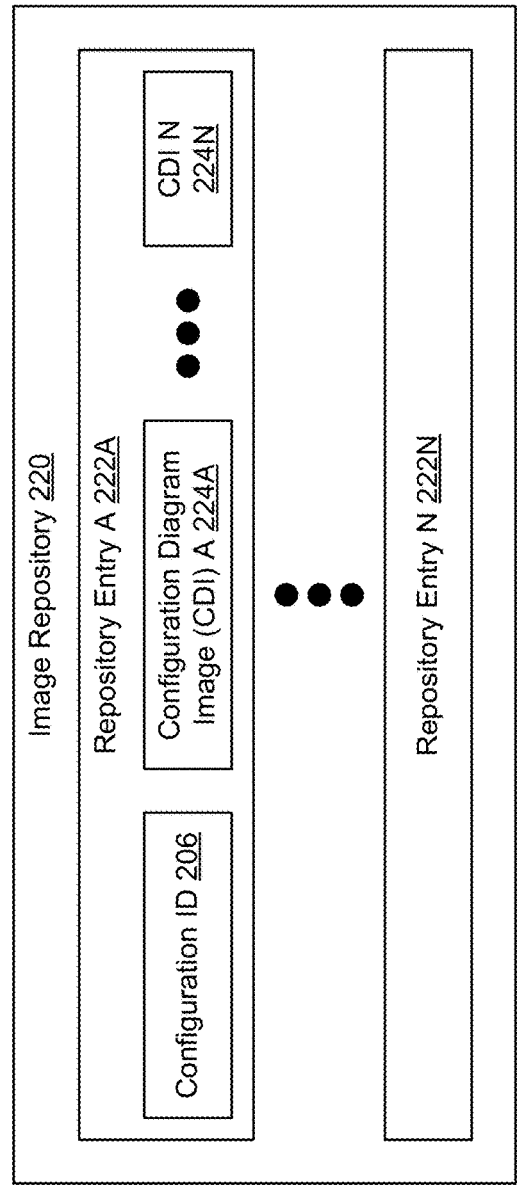
FIG. 2B shows an image repository in accordance with one or more embodiments of the invention.

Further, the configuration ID (206) may also serve as an index or reference to a relevant image repository entry (see e.g., FIG. 2B).

In one embodiment of the invention, the SCB (208) may refer to a reference system configuration, for a solution node (or solution node group), from which configuration drifts may be detected. A configuration drift may refer to a phenomenon whereby the state and/or configuration of a device (or devices) does/do not match that which is expected. Accordingly, said another way, the SCB (208) may reflect the expected or required system (e.g., basic input-output system (BIOS)) settings and/or firmware inventory that should be installed on a solution node (or across a solution node group) to effect a given datacenter solution. Further, as a reference system configuration, the SCB (208) may be used in the validation of a current system configuration implemented on a solution node (or across a solution node group). The validation may detect whether the current system configuration is compliant or non-compliant with the expected or required system configuration.

In one embodiment of the invention, the NCB (210) may refer to a reference host network configuration, for a solution node (or solution node group), from which configuration drifts (described above) may be detected. That is, the NCB (210) may reflect the expected or required interconnectivities, between the various solution infrastructure components, that should be arranged to effect a given connectivity architecture. Further, as a reference host network configuration, the NCB (210) may be used in the validation of a current host network configuration implemented on a solution node (or across a solution node group). The validation may detect whether the current host network configuration is compliant or non-compliant with the expected or required host network configuration.

FIG. 2B shows an image repository in accordance with one or more embodiments of the invention. The portrayed image repository (220) may reference the service image repository residing on the solution integration service (SIS) (see e.g., FIG. 1A) or the local image repository residing in local cache on the portable scanning device (PSD) (see e.g., FIG. 1B). Further, as mentioned above, an image repository (220) may represent data storage wherein various image alternatives for visualizing various solution integrations may be consolidated.

In one embodiment of the invention, an image repository (220) may index information stored therein, for example, by way of one or more repository entries (222A-222N). Each repository entry (222A-222N) may consolidate pertinent visualization media relevant to depicting one or more implementation variations of a unique solution integration and user-desired host network configuration combination. Accordingly, each repository entry (22A-222N) may include, but is not limited to, a configuration identifier (ID) (206) and one or more configuration diagram images (CDIs) (224A-224N). Each of these items is described below.

In one embodiment of the invention, the configuration ID (206) may refer to an arbitrary-length character string assigned by administrators of a solution integration service (SIS) (see e.g., FIG. 1A). Specifically, the configuration ID (206) may uniquely identify a given solution integration and user-desired host network configuration combination, which may define or characterize a given solution infrastructure. Further, the configuration ID (206) may tie the image repository entry (222A-222N) to a relevant configuration repository entry (see e.g., FIG. 2A).

In one embodiment of the invention, a CDI (224A-224N) may refer to a visual representation (e.g., diagram) that depicts a variant of a baseline (i.e., expected or required) solution integration and user-desired host network configuration combination. The solution integration and user-desired host network configuration combination may be unique to the image repository entry (222A-222N) within the CDI (224A-224N) resides, and the corresponding configuration repository entry (202A-202N) that may share the same configuration ID (206). Variants of a given baseline solution integration and user-desired host network configuration combination may account for, and accordingly, may depict different scenarios whereby a current state and/or configuration of a solution node (or a solution node group) reflects that node (or node group): may or may not be compliant with the given baseline; may or may not include an installed operating system (OS); or may or may not reflect any other comparative attribute. Examples of possible variants for given baseline solution integration and user-desired host network configuration combinations are portrayed below with respect to FIGS. 3A-3E. Furthermore, a CDI (224A-224N) may be implemented using any existing or future developed image format—e.g., the scalable vector graphics (SVG) image format.

Figure 3B:
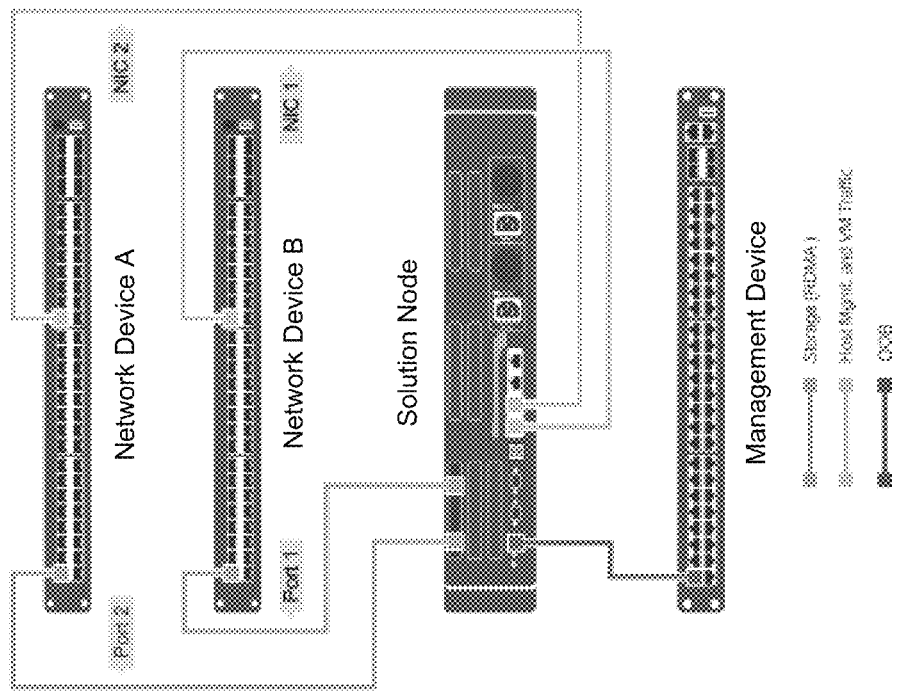
FIGS. 3A-3E show exemplary configuration diagram images in accordance with one or more embodiments of the invention.
Figure 3A:
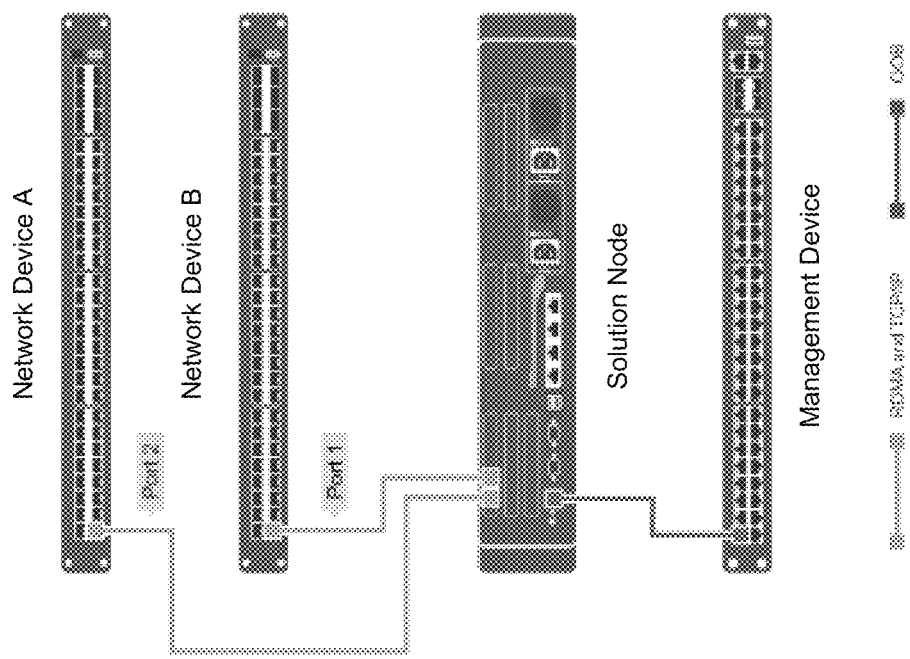

FIGS. 3A-3E show exemplary configuration diagram images (CDIs) in accordance with one or more embodiments of the invention. Turning to FIG. 3A, a possible CDI, for a variant of a solution node based solution integration and user-desired host network configuration combination, is portrayed. In this illustrated variant of the solution node based combination, the solution integration is reflected through the depiction of a single solution node connected to other components (i.e., a first network device, a second network device, and a management device) of a solution infrastructure. Meanwhile, the user-desired host network configuration is reflected through the port-to-port mappings (or interconnectivities) between, and unique to, the various components of the reflected solution integration. The user-desired host network configuration reflected here is directed to a converged connectivity architecture.

Turning to FIG. 3B, a possible CDI, for another variant of the solution node based solution integration and user-desired host network configuration combination (shown in FIG. 3A), is portrayed. In this illustrated variant of the solution node based combination, the solution integration remains the same, and thus, is reflected through the depiction of a single solution node connected to other components of the solution infrastructure. The user-desired host network configuration, however, is different and, subsequently, is reflected through the depiction of different port-to-port mappings (or interconnectivities) between, and unique to, the various components of the reflected solution integration. In contrast to FIG. 3A, the user-desired host network configuration reflected here is alternatively directed to a traditional (or non-converged) connectivity architecture. Accordingly, the variant factor selective of which possible CDI (i.e., FIG. 3A or FIG. 3B), should be displayed to a user, is the user-desired host network configuration.

Figure 3C:
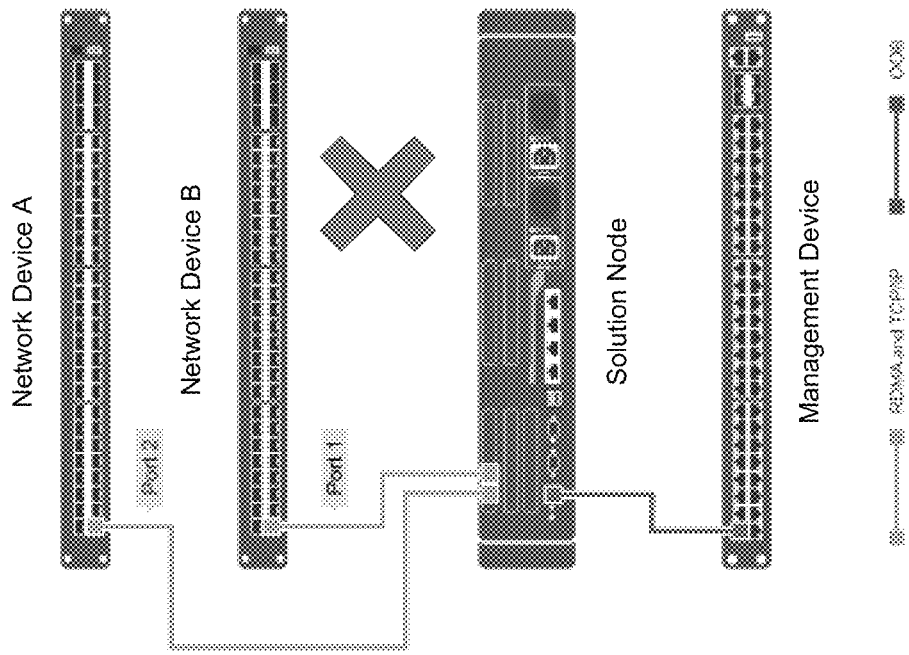
Figure 3C:
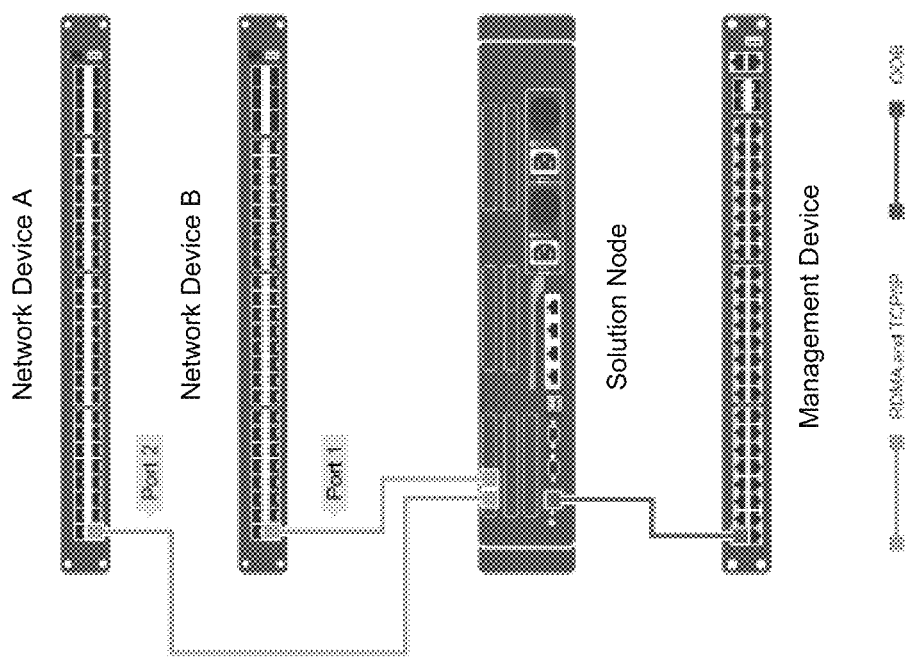

Turning to FIG. 3C, a comparison between two different possible CDIs (or variants), for a same solution node based solution integration and user-desired host network configuration, is portrayed. That is, in both of the illustrated variants of the solution node based combination, the solution integration—i.e., a single solution node connected to other solution infrastructure components—and the user-desired host network configuration—i.e., a converged connectivity architecture—are commonalties. The difference, or variant factor selective of which possible CDI (i.e., left or right), should be displayed to a user, lies with a system compliance determined for the solution node based combination. System compliance, in this case, may refer to the validation of a current system configuration, implemented on the single solution node, against a baseline system configuration that should be implemented to properly effect the solution node based combination. System compliance or non-compliance may be determined based on the degree of configuration drift detected, where the detected configuration drift refers to a phenomenon whereby the current system configuration does not match that which is expected and outlined in the baseline system configuration. Accordingly, by way of examples, a baseline-compliant current system configuration may be displayed, to a user, through the left possible CDI (which may exclude an "X"), whereas a baseline-non-compliant current system configuration may be displayed, to the user, alternatively through the right possible CDI (which may include an "X").

Figure 3D:
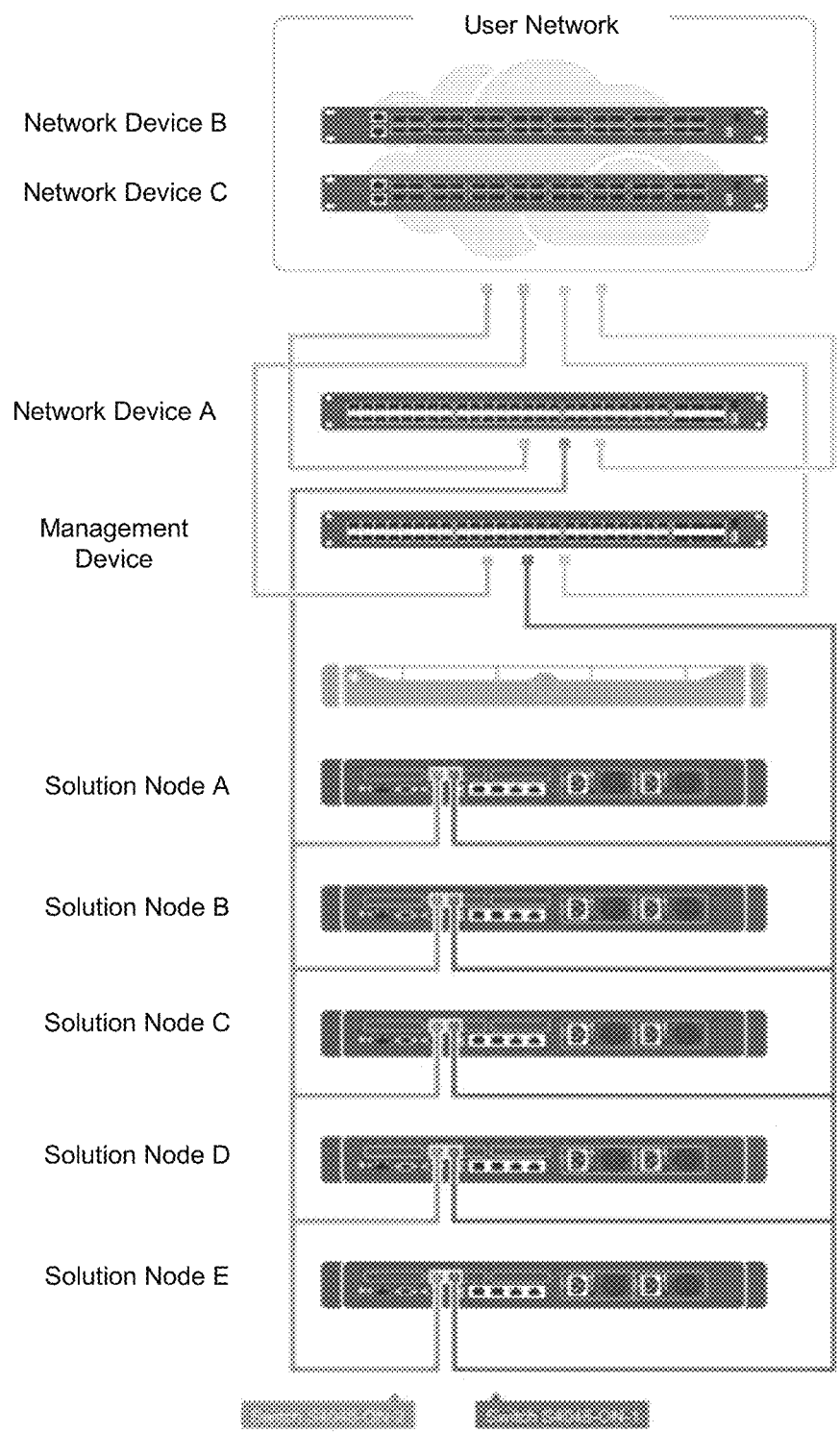

Turning to FIG. 3D, a possible CDI, for a variant of a solution node group based solution integration and user-desired host network configuration combination, is portrayed. In this illustrated variant of the solution node group based combination, the solution integration is reflected through the depiction of multiple solution nodes connected to other components (i.e., a first network device, a second network device, a third network device, and a management device) of a solution infrastructure. Meanwhile, the user-desired host network configuration is reflected through the port-to-port mappings (or interconnectivities) between, and unique to, the various components of the reflected solution integration. The user-desired host network configuration reflected here is directed to a converged (i.e., redundant, high availability) connectivity architecture.

Figure 3E:
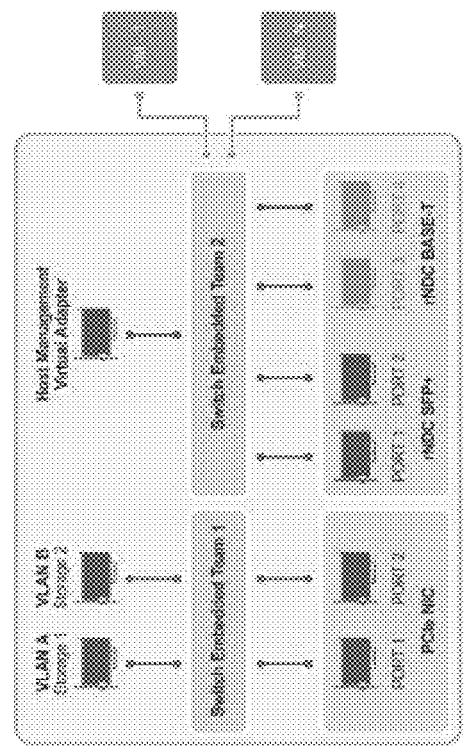
Figure 3E:
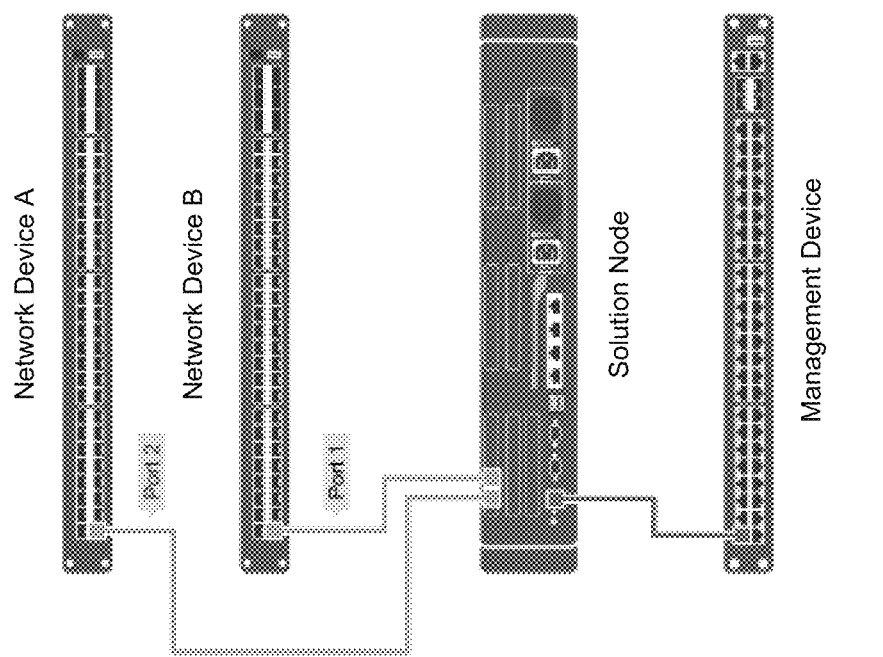

Turning to FIG. 3E, a possible CDI, for another variant of the solution node based solution integration and user-desired host network configuration combination (shown in FIG. 3A), is portrayed. In this illustrated variant of the solution node based combination, the solution integration and user-defined host network configuration remain the same, and thus, are reflected through the depiction of a single solution node connected to other components, and port-to-port mappings (or interconnectivities) between, and unique to, the various components of the reflected solution integration, respectively. The difference, or variant factor selective of which possible CDI (i.e., FIG. 3A or FIG. 3E), should be displayed to a user, lies with the detected installation of an operating system (OS) on the single solution node. Should an installed OS be detected, the possible CDI may depict a representation of a baseline network configuration, in addition to the representation of the baseline variant of the solution node based combination (see e.g., FIG. 3A). The baseline network configuration may further detail the expected interconnectivities between communication-enabling subcomponents (e.g., network interface cards (NICs), network adapters, etc.) of the various components of the reflected solution integration. These detailed expected interconnectivities may reflect which communication-enabling subcomponents handle certain varieties of network traffic— e.g., virtual machine traffic, host management traffic, storage traffic, etc.

FIGS. 4A-4D show flowcharts describing a method for solution integration labeling in accordance with one or more embodiments of the invention. The various steps outlined below may be substantively performed by the solution integration labeler (SIL) of the mobile application executing on the portable scanning device (PSD) (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Figure 4A:
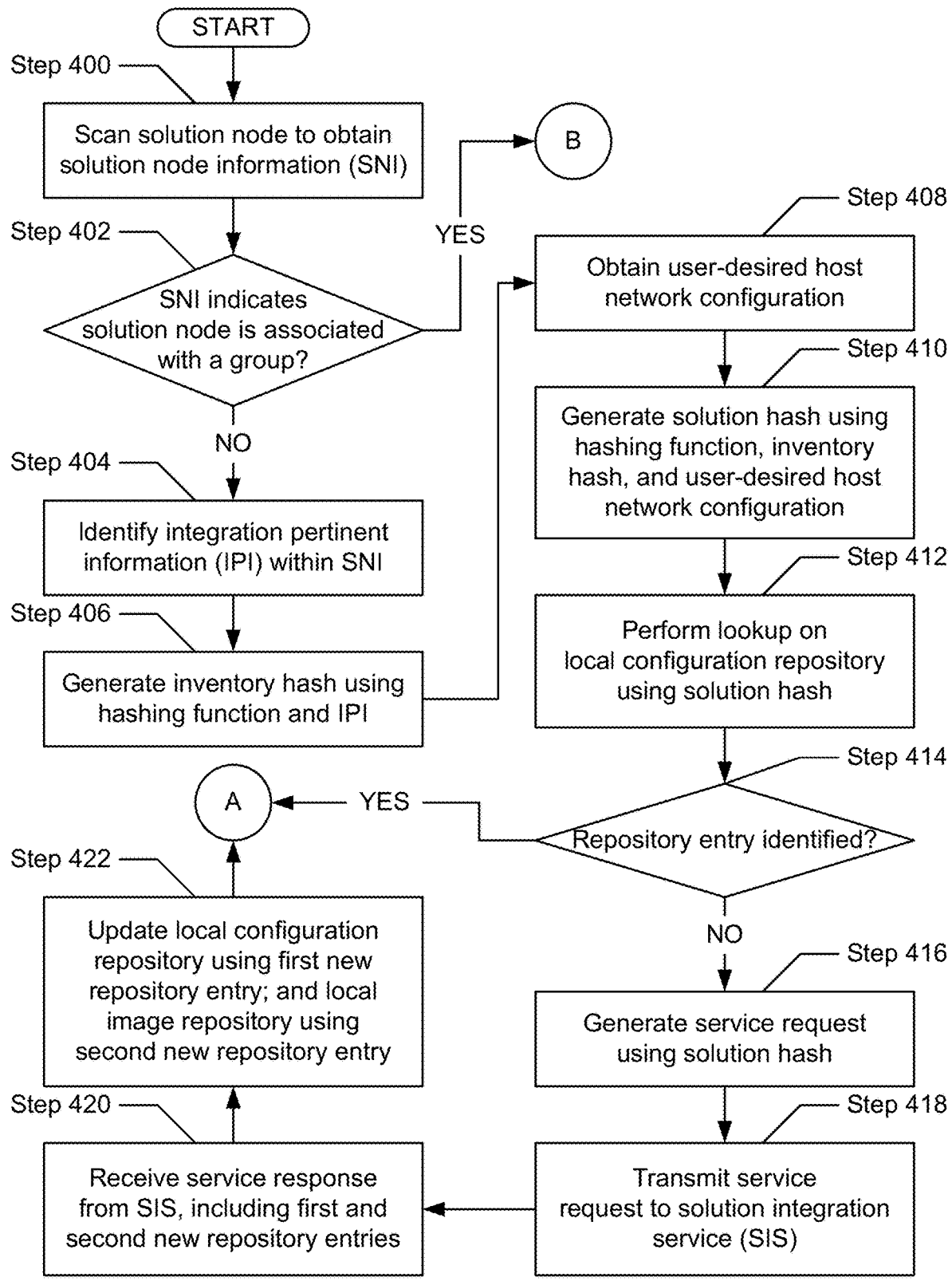
FIGS. 4A-4D show flowcharts describing a method for solution integration labeling in accordance with one or more embodiments of the invention.

Turning to FIG. 4A, in Step 400, a solution node of a solution infrastructure (see e.g., FIG. 1A) is scanned. Specifically, in one embodiment of the invention, the SIL may prompt a user of the PSD, through a graphical user interface (GUI), to scan the solution node. In response, the user may position the PSD within proximity of the solution node and instruct the SIL, through a GUI widget displayed on the GUI, to scan (e.g., exchange information with) the solution node. Based on detecting the activation of the aforementioned GUI widget, the SIL may subsequently issue a system call, via an application programming interface (API), to the operating system (OS) of the PSD, where the system call may pertain to requesting usage of the PSD wireless transceiver(s) to relay a query for information. The OS, in turn, may interface with the wireless transceiver(s) to: transmit the query to the solution node; and receive information (i.e., solution node information (SNI)) from the solution node in response to the transmitted query. Hereinafter, the OS may provide the received SNI back to the SIL, as a call response, via the API.

In one embodiment of the invention, the above-mentioned received SNI may refer to an assortment of information reflective of the current state of and the current configurations implemented on the solution node. To that extent, the SNI may include, but is not limited to, any subset or all of the following: (a) system event and/or lifecycle logs—i.e., a detailed record of system, security, and application notifications, as well as firmware update history; (b) firmware details—i.e., a list identifying the various firmware and corresponding firmware versions, respective to various hardware components, installed on the solution node; (c) network details—i.e., a list of various network-pertinent properties (e.g., Internet Protocol (IP) version, solution node IP address(es), network gateway IP address, subnet mask, etc.) associated with or significant to the solution node; (d) a hardware inventory—i.e., computer processor and memory specifications, as well as a list identifying the various physical (or hardware) devices installed on the solution node, including (for each device): a service tag associated with the device, a device type of the device, a device model for the device, etc.; (e) health statuses—i.e., a snapshot of the current temperatures measured across various heat-generating components (e.g., computer processors, etc.), the observed power drawn or consumed by the solution node, and the current status of various systems and/or properties (e.g., storage capacity, power supply capacity, fan output or input, cyber intrusion, etc.) with respect to baselines or normal values and ranges; (f) software details—i.e., a list identifying the various software applications (including the operating system(s) (OS)), if any, installed on the solution node; (g) host network configuration information—i.e., network connectivity (e.g., port-to-port) mappings between solution node network hardware (e.g., network interface cards (NIC), network adapters, etc.) and other solution infrastructure components (e.g., a management device, one or more network devices, one or more other solution nodes) (see e.g., FIG. 1A)); (i) system configuration information (SCI)—i.e., firmware inventory (see e.g., (f) firmware details) and/or basic input-output system (BIOS) settings for: controlling hardware-hardware and/or hardware-software communications on the solution node, outlining the boot sequence to properly start (or bring) up the solution node, settings dictating the behavior of various device (or hardware) components of the solution node, etc.; and (j)

group member information (GMI)—i.e., a group assignment, if any, associated with the solution node, as well as a list of one or more other solution nodes of the solution infrastructure that may also belong to the group assignment.

In Step 402, a determination is made as to whether the SNI (obtained in Step 400) reflects that the solution node is associated with a solution node group. A solution node group may refer to a logical grouping of related solution node(s), which may be working together to implement a service, or deploy a collective workload. Further, the determination may entail examining whether the received SNI includes GMI (described above). Accordingly, in one embodiment of the invention, if it is determined that the SNI includes GMI, then the solution node is associated with a solution node group and the process may proceed to Step 450 (see e.g., FIG. 4C). On the other hand, in another embodiment of the invention, if it is alternatively determined that the SNI excludes GMI, then the solution node is not associated with a solution node group and the process may alternatively proceed to Step 404.

In Step 404, after determining (in Step 402) that the solution node is not associated with a solution node group, integration pertinent information (IPI) is identified and extracted from the SNI (obtained in Step 400). In one embodiment of the invention, IPI may refer to a subset of solution node state and/or configuration information that may specifically pertain to solution integration. A solution integration may refer to a specialized subset of subcomponents integrated into each of the various datacenter components (e.g., management device, network device(s), and solution node(s)) that form a solution infrastructure (see e.g., FIG. 1A). These specialized subcomponents pertain to hardware, software, firmware, and/or any combination thereof, which particularly enable the various interconnectivities between the various datacenter components.

Accordingly, in one embodiment of the invention, IPI may include, but is not limited to, any subset or all of the following: (a) firmware details specifically directed to network interconnectivities—i.e., firmware identification and version information pertaining to network hardware (e.g., NIC, network adapter, etc.) associated firmware installed on the solution node; (b) network details—i.e., a list of various network-pertinent properties (e.g., Internet Protocol (IP) version, solution node IP address(es), network gateway IP address, subnet mask, etc.) associated with or significant to the solution node; (c) hardware inventory specifically directed to network interconnectivities—i.e., hardware identification and other metadata (e.g., a service tag associated with the device, a device type of the device, a device model for the device, etc.) pertaining to network hardware installed on the solution node; (d) a remote direct memory access (RDMA) type associated with installed network hardware; and (e) throughput capabilities of the installed network hardware.

In Step 406, an inventory hash is generated using a hashing function and the IPI (identified/extracted in Step 404). In one embodiment of the invention, the hashing function may refer to a data association algorithm that maps an input of any arbitrary length (e.g., the IPI) to a deterministic, fixed-length output (also referred to as a hash or digest). Further, generation of the inventory hash may entail using any existing or future developed data association or hashing algorithm (e.g., the Pearson hashing algorithm, the Fowler-Noll-Vo (FNV) hashing algorithm, the Jenkins hashing algorithm, etc.). By way of an example, the inventory hash may be represented through an alphanumeric character string.

In Step 408, a user-desired host network configuration is obtained. In one embodiment of the invention, the user-desired host network configuration may refer to a connectivity architecture, sought to be implemented by administrators of a solution infrastructure, that reflects or maps the interconnectivities between the various datacenter components. Further, this connectivity architecture may also reflect the management and deployment complexity, sought to be implemented by the aforementioned administrators, for the solution infrastructure. By way of examples, the user-desired host network configuration may be directed to a traditional (i.e., non-converged) connectivity architecture or a converged connectivity architecture (described above) (see e.g., FIG. 2A).

In Step 410, a solution hash is generated using a hashing function, the inventory hash (generated in Step 406), and the user-desired host network configuration (obtained in Step 408). In one embodiment of the invention, the hashing function may refer to a data association algorithm that maps an input of any arbitrary length (e.g., a combination of the inventory hash and the user-desired host network configuration) to a deterministic, fixed-length output (also referred to as a hash or digest). Further, generation of the inventory hash may entail using any existing or future developed data association or hashing algorithm (e.g., the Pearson hashing algorithm, the Fowler-Noll-Vo (FNV) hashing algorithm, the Jenkins hashing algorithm, etc.). Moreover, the hashing function used to generate the solution hash may or may not be the same hashing function used to generate the inventory hash. By way of an example, the solution hash may be represented through an alphanumeric character string.

In Step 412, a lookup is performed on a local configuration repository. In one embodiment of the invention, the local configuration repository may represent data storage, on the PSD, wherein different compliance and configuration combinations for validating various solution integrations may be consolidated. Further, the lookup may be performed using the solution hash (generated in Step 410).

In Step 414, a determination is made as to whether a repository entry, of the local configuration repository, has been identified (based on the lookup performed in Step 412). Identification of the repository entry, if any, may entail matching the solution hash used to perform the lookup with another solution hash specified in the repository entry. Accordingly, in one embodiment of the invention, if it is determined that a repository entry has been identified, then the process may proceed to Step 430 (see e.g., FIG. 4B). On the other hand, in another embodiment of the invention, if it is alternatively determined that a repository entry has not been identified, then the process may alternatively proceed to Step 416.

In Step 416, after determining (in Step 414) that a repository entry, of the local configuration repository, has not been identified based on the lookup performed (in Step 412), a service request is generated. In one embodiment of the invention, the service request may represent a query for information. Further, the service request may include or may be generated using the solution hash (generated in Step 410). Following the generation of the service request, in Step 418, the service request is transmitted to the solution integration service (SIS) (see e.g., FIG. 1A) via a network and facilitated through the wireless transceiver(s) of the PSD.

In Step 420, a service response is subsequently received from the SIS. In one embodiment of the invention, the service response may represent a reply answering a corresponding service request (e.g., the service request transmitted in Step 418). Further, the service response may include a set of new repository entries—i.e., a first new repository entry and a second new repository entry. The first new repository entry may be a service configuration repository (see e.g., FIG. 1A) entry that specifies a solution hash matching the solution hash enclosed in the earlier transmitted service request. Similarly, the second new repository entry may be a service image repository (see e.g., FIG. 1A) entry that specifies a solution hash matching the solution hash enclosed in the earlier transmitted service request.

In Step 422, using the first and second new repository entries (received in Step 420), the local configuration and local image repositories are updated, respectively. Specifically, in one embodiment of the invention, the local configuration repository, on the PSD, may be updated to include the received service configuration repository entry—i.e., the first new repository entry. Meanwhile, the local image repository, on the PSD, may be updated to include the received service image repository entry—i.e., the second new repository entry. Hereinafter, the process proceeds to Step 430 (see e.g., FIG. 4B).

Figure 4B:
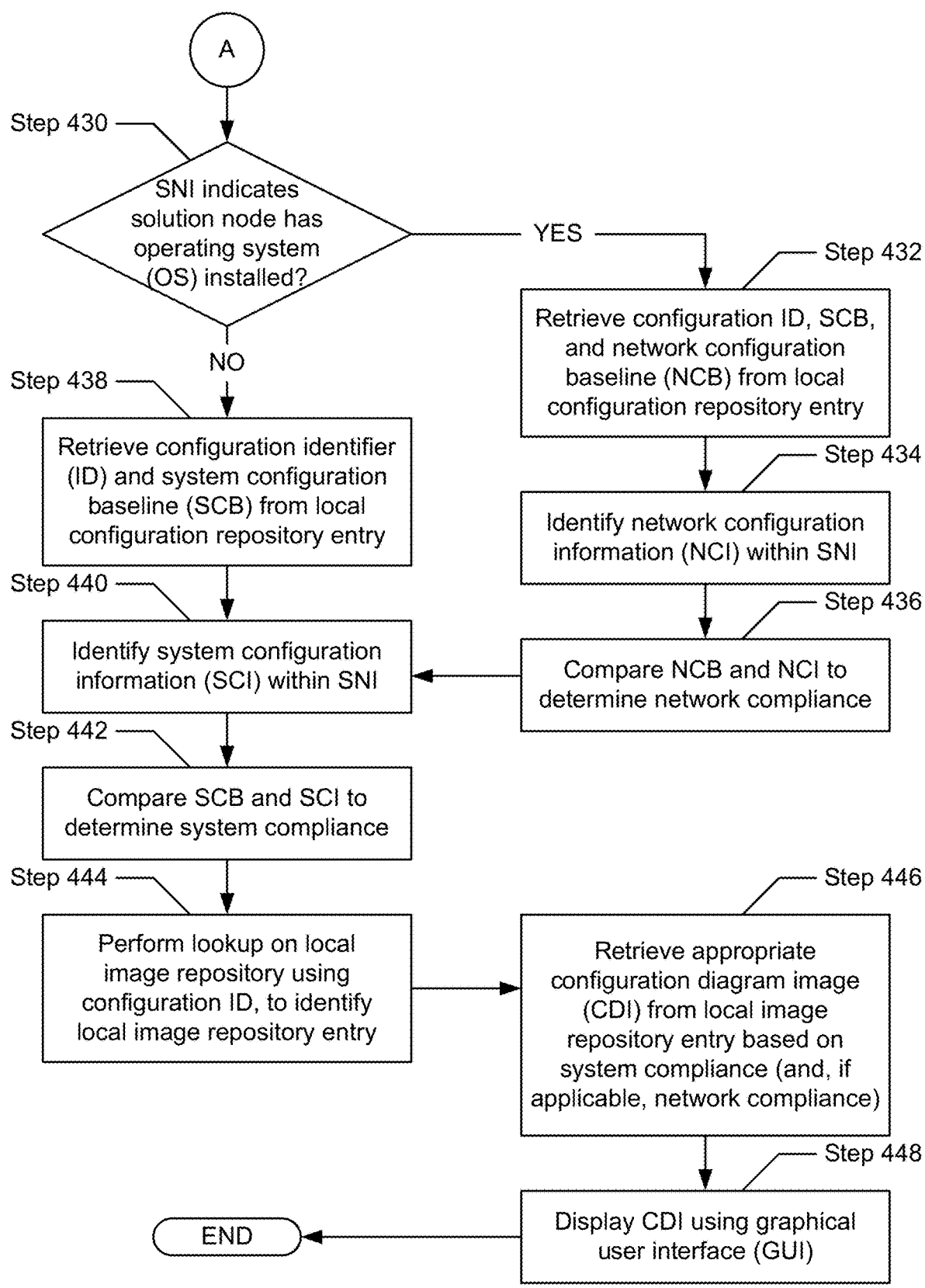

Turning to FIG. 4B, in Step 430, following either updating the local configuration and local image repositories (in Step 422) or determining that a local configuration repository entry has not been identified (in Step 414), a determination is made as to whether the SNI (obtained in Step 400) reflects that the solution node includes an operating system (OS) executing thereon. The determination may entail examining whether the received SNI includes software details (described above) identifying an installed OS. Accordingly, in one embodiment of the invention, if it is determined that the SNI includes software details reflecting the installation of an OS, then the process may proceed to Step 432. On the other hand, in another embodiment of the invention, if it is alternatively determined that the SNI excludes software details, or includes software details that does not reflect the installation of an OS, then the process may alternatively proceed to Step 438.

In Step 432, after determining (in Step 430) that an OS is installed on the solution node, information is retrieved from the local configuration repository entry (identified in Step 414 based on the lookup performed in Step 412). In one embodiment of the invention, the aforementioned retrieved information may include a configuration identifier (ID), a system configuration baseline (SCB), and a network configuration baseline (NCB). The configuration ID may refer to an arbitrary-length character string that uniquely identifies a given solution integration and user-desired host network configuration combination. The SCB may reflect the expected or required system (e.g., basic input-output system (BIOS)) settings and/or firmware inventory that should be installed on the solution node (scanned in Step 400) to effect a given datacenter solution. The NCB may reflect the expected or required interconnectivities, between the various solution infrastructure components (i.e., between the solution node and other solution infrastructure components), that should be arranged to effect a given connectivity architecture.

In Step 434, network configuration information (NCI) is identified and extracted from the SNI (obtained in Step 400). In one embodiment of the invention, NCI may refer to a subset of solution node state and/or configuration information that may specifically pertain to connectivity implementation. Accordingly, NCI may include, but is not limited to, any subset or all of the following: (a) host network configuration information—i.e., network connectivity (e.g., port-to-port) mappings between solution node network hardware (e.g., network interface cards (NIC), network adapters, etc.) and other solution infrastructure components (e.g., a management device, one or more network devices, one or more other solution nodes (see e.g., FIG. 1A)); (b) under a traditional (or non-converged) connectivity architecture: network traffic assignment information—i.e., assignments identifying which solution node network hardware should be used to marshal storage traffic versus management and/or virtual machine traffic; (c) a validation identifying whether a remote direct memory access (RDMA) associated with the solution node network hardware, responsible for storage traffic, is enabled; and (d) should jumbo (i.e., large-size) network traffic frames be used, a validation ensuring that the maximum transmission unit (MTU) size setting on the solution node is configured to support jumbo network traffic frames.

In Step 436, a comparison is performed between the NCB (retrieved in Step 432) and the NCI (identified/extracted in Step 434). Specifically, in one embodiment of the invention, a validation of the NCI—representative of current connectivity implementation detected between the solution node and other solution infrastructure components—may be performed against the NCB, which reflects the expected or required interconnectivities to enable a desired connectivity architecture (e.g., traditional/non-converged versus converged). Further, a compliance or non-compliance of the NCI, in accordance with the NCB, may be determined based on a degree of configuration drift. Configuration drifts may refer to phenomena whereby the state and/or configuration of a device (or devices) does/do not match that which is expected. The determined compliance or non-compliance of the NCI may be referred herein as the network compliance. From here, the process proceeds to Step 440.

In Step 438, after determining (in Step 430) that an OS is not installed on the solution node, information is retrieved from the local configuration repository entry (identified in Step 414 based on the lookup performed in Step 412). In one embodiment of the invention, the aforementioned retrieved information may include a configuration identifier (ID) and a system configuration baseline (SCB). The configuration ID may refer to an arbitrary-length character string that uniquely identifies a given solution integration and user-desired host network configuration combination. The SCB may reflect the expected or required system (e.g., basic input-output system (BIOS)) settings and/or firmware inventory that should be installed on the solution node (scanned in Step 400) to effect a given datacenter solution.

In Step 440, following the retrieval of the configuration ID and SCB (in Step 438) or the validation of the NCI against the NCB (performed in Step 436), system configuration information (SCI) is identified and extracted from the SNI (obtained in Step 400). In one embodiment of the invention, SCI may refer to a subset of solution node state and/or configuration information that may specifically pertain to system device behavior and interactivity. Accordingly, SCI may include, but is not limited to, any subset or all of the following: (a) firmware inventory (i.e., firmware details (described above)) and/or basic input-output system (BIOS) settings for: controlling hardware-hardware and/or hardware-software communications on the solution node, outlining the boot sequence to properly start (or bring) up the solution node, settings dictating the behavior of various device (or hardware) components of the solution node, etc.; (b) central processor unit (CPU) settings—e.g., enablement or disablement of virtualization technology, CPU power profile tailored for maximum performance, etc.; and (c) solution node power profile settings.

In Step 442, a comparison is performed between the SCB (retrieved in Step 438 or Step 432) and the SCI (identified/extracted in Step 440). Specifically, in one embodiment of the invention, a validation of the SCI—representative of current system device behavior and interactivity detected on the solution node—may be performed against the SCB, which reflects the expected or required system settings and/or firmware inventory to enable a desired datacenter solution. Further, a compliance or non-compliance of the SCI, in accordance with the SCB, may be determined based on a degree of configuration drift. Configuration drifts may refer to phenomena whereby the state and/or configuration of a device (or devices) does/do not match that which is expected. The determined compliance or non-compliance of the SCI may be referred herein as the system compliance.

In Step 444, a lookup is performed on a local image repository. In one embodiment of the invention, the local image repository may represent data storage, on the PSD, wherein various image alternatives for visualizing various solution integrations may be consolidated. The lookup may be performed using the configuration ID (retrieved in Step 432 or Step 438). Further, the lookup may identify a local image repository entry. Identification of the local image repository entry may entail matching the configuration ID used to perform the lookup with another configuration ID specified in the local image repository entry.

In Step 446, a configuration diagram image (CDI) is retrieved from the local image repository entry (identified in Step 444). In one embodiment of the invention, the CDI may refer to a visual representation (e.g., diagram) that depicts a variant of a baseline (i.e., expected or required) solution integration and user-desired host network configuration combination. The variant selected, from a range of possible variants (or possible CDIs) stored in the local image repository entry, may depend on and relate to the network compliance (determined in Step 436) and/or the system compliance (determined in Step 442). Additional or alternative factors may sway the selection of the CDI—e.g., hardware and/or firmware inventory (e.g., whether network hardware is remote direct memory access (RDMA) capable, which if so, a CDI may be selected that reflects a converged connectivity architecture), a solution node type (e.g., rack-mounted versus modular), etc.

Thereafter, in Step 448, the CDI (retrieved in Step 446) is subsequently displayed. Specifically, in one embodiment of the invention, the CDI may be conveyed, to a user, through the graphical user interface (GUI) of the PSD (see e.g., FIG. 1B). Hereinafter, the process ends.

Figure 4C:
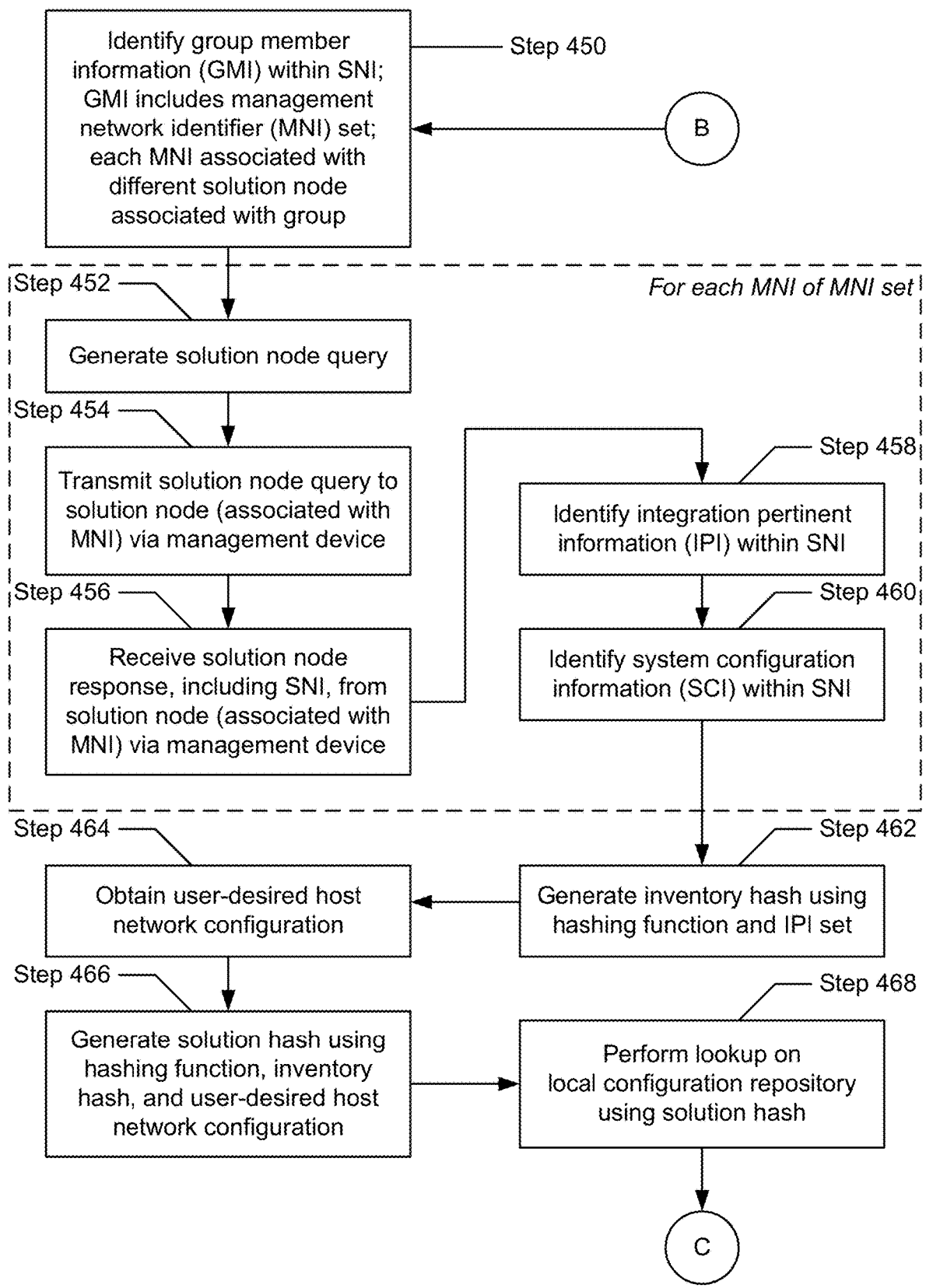

Turning to FIG. 4C, in Step 450, after determining (in 402) that the solution node is associated with a solution node group, the group member information (GMI) is retrieved and extracted from the SNI (obtained in Step 400). In one embodiment of the invention, GMI may refer to a subset of solution node state and/or configuration information that may specifically pertain to group identification and management. Accordingly, GMI may include, but is not limited to, a group assignment, associated with the solution node, as well as a list of one or more other solution nodes of the solution infrastructure that may also belong to the group assignment. The other solution node(s) may each be identified, for example, using a respective management network identifier (MNI). A MNI may represent an arbitrary-length character string that permits a management device (see e.g., FIG. 1A) of the solution infrastructure to uniquely identify a solution node.

Hereinafter, a subset of the remaining steps (i.e., Steps 452 through 460) may be performed for each other solution node of a set of one or more other solution nodes (identified as associated with the solution node group in Step 450). Subsequently, in Step 452, for a given other solution node, a solution node query is generated. In one embodiment of the invention, the solution node query may represent a request for information. Further, the solution node query may include or be generated using at least the MNI associated with the given other solution node.

In Step 454, the solution node query (generated in Step 452), for a given other solution node, is transmitted to the management device (see e.g., FIG. 1A) of the solution infrastructure. In one embodiment of the invention, the transmission may travel via an out-of-band network and may be facilitated through the wireless transceiver(s) of the PSD.

In Step 456, a solution node response from the management device is received. In one embodiment of the invention, the solution node response may represent a reply answering the corresponding solution node query for a given other solution node (transmitted in Step 454). Specifically, upon receiving a solution node query, the management device of the solution infrastructure may: (a) extract the MNI associated with a given other solution node and specified in the solution node query; (b) identify a network interface or port (of the management device), based on the MNI, where the identified network interface/port operatively connects the management device to the given other solution node; (c) forward the solution node query for information to the given other solution node through the identified network interface/port; (d) await and subsequently receive the solution node response, to the solution node query, from the given other solution node through the identified network interface/port or another network interface/port; and (e) transmit the solution node response, wirelessly and back to the PSD, via the above-mentioned out-of-band network. Furthermore, the solution node response may include solution node information (SNI) (i.e., an assortment of information reflective of the current state and the current configurations) pertinent to the given other solution node.

In Step 458, for a given other solution node, integration pertinent information (IPI) is identified and extracted from the SNI associated with the given other solution node (received in Step 456). In one embodiment of the invention, IPI may refer to a subset of solution node state and/or configuration information that may specifically pertain to solution integration (described above). Further, in Step 460, system configuration information (SCI) is identified and extracted from the aforementioned SNI. The SCI may refer to a subset of solution node state and/or configuration information that may specifically pertain to system device behavior and interactivity (described above). In one embodiment of the invention, IPI and SCI respective to the solution node (scanned in Step 400) may also be identified and extracted from the SNI (also obtained in Step 400).

In Step 462, following the identification of IPI and SCI for each other solution node in the solution node group, an inventory hash is generated using a hashing function and the IPI respective to the solution node and the other solution node(s) of the solution node group (identified/extracted in Step 458). In one embodiment of the invention, the hashing function may refer to a data association algorithm that maps an input of any arbitrary length (e.g., the various IPI) to a deterministic, fixed-length output (also referred to as a hash or digest). Further, generation of the inventory hash may entail using any existing or future developed data association or hashing algorithm (e.g., the Pearson hashing algorithm, the Fowler-Noll-Vo (FNV) hashing algorithm, the Jenkins hashing algorithm, etc.). By way of an example, the inventory hash may be represented through an alphanumeric character string.

In Step 464, a user-desired host network configuration is obtained. In one embodiment of the invention, the user-desired host network configuration may refer to a connectivity architecture, sought to be implemented by administrators of a solution infrastructure, that reflects or maps the interconnectivities between the various datacenter components. Further, this connectivity architecture may also reflect the management and deployment complexity, sought to be implemented by the aforementioned administrators, for the solution infrastructure. By way of examples, the user-desired host network configuration may be directed to a traditional (i.e., non-converged) connectivity architecture or a converged connectivity architecture (described above) (see e.g., FIG. 2A).

In Step 466, a solution hash is generated using a hashing function, the inventory hash (generated in Step 462), and the user-desired host network configuration (obtained in Step 464). In one embodiment of the invention, the hashing function may refer to a data association algorithm that maps an input of any arbitrary length (e.g., a combination of the inventory hash and the user-desired host network configuration) to a deterministic, fixed-length output (also referred to as a hash or digest). Further, generation of the inventory hash may entail using any existing or future developed data association or hashing algorithm (e.g., the Pearson hashing algorithm, the Fowler-Noll-Vo (FNV) hashing algorithm, the Jenkins hashing algorithm, etc.). Moreover, the hashing function used to generate the solution hash may or may not be the same hashing function used to generate the inventory hash. By way of an example, the solution hash may be represented through an alphanumeric character string.

In Step 468, a lookup is performed on a local configuration repository. In one embodiment of the invention, the local configuration repository may represent data storage, on the PSD, wherein different compliance and configuration combinations for validating various solution integrations may be consolidated. Further, the lookup may be performed using the solution hash (generated in Step 466). From here, the process proceeds to Step 480 (see e.g., FIG. 4D).

Figure 4D:
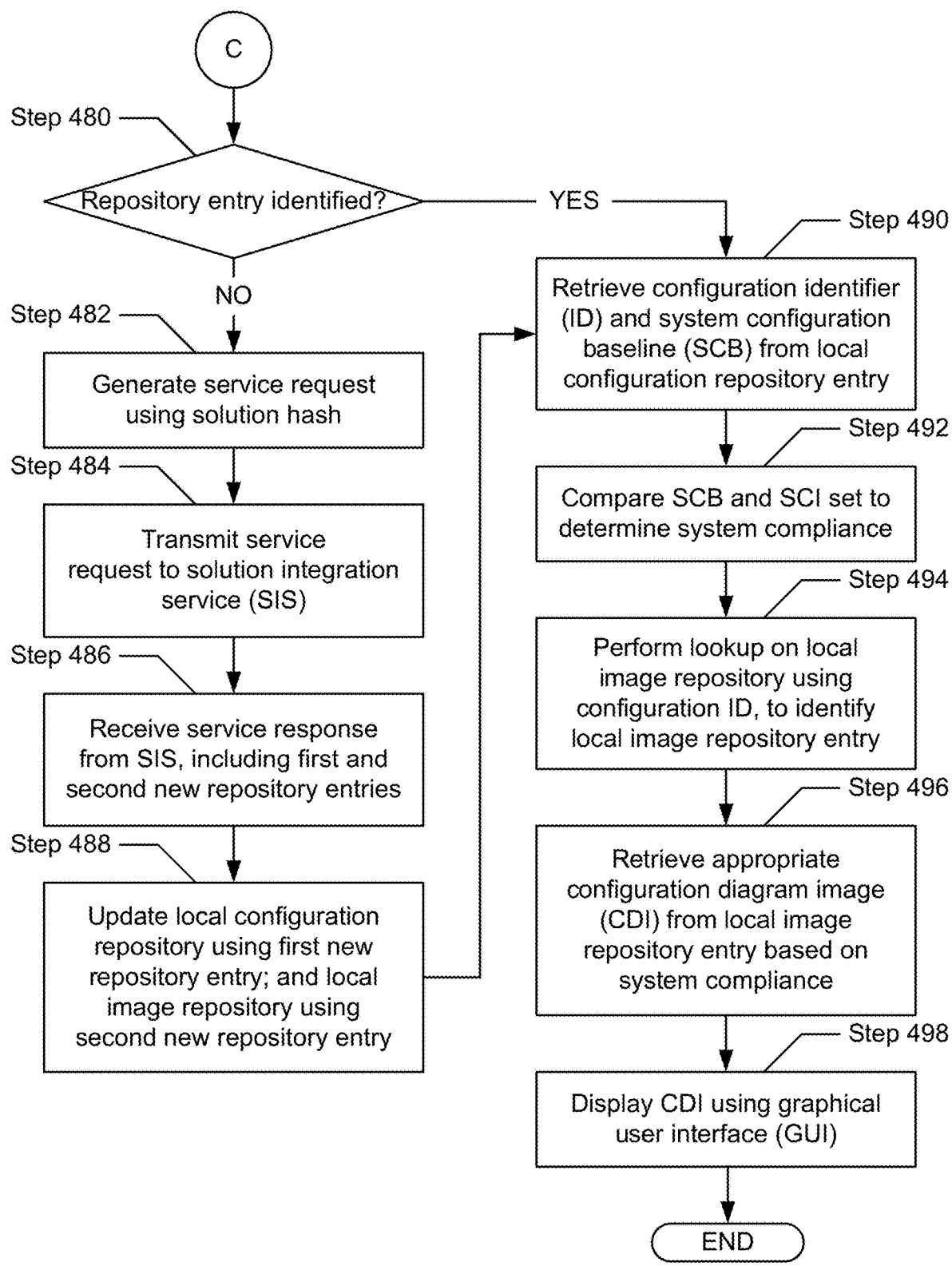

Turning to FIG. 4D, in Step 480, a determination is made as to whether a repository entry, of the local configuration repository, has been identified (based on the lookup performed in Step 468). Identification of the repository entry, if any, may entail matching the solution hash used to perform the lookup with another solution hash specified in the repository entry. Accordingly, in one embodiment of the invention, if it is determined that a repository entry has been identified, then the process may proceed to Step 490. On the other hand, in another embodiment of the invention, if it is alternatively determined that a repository entry has not been identified, then the process may alternatively proceed to Step 482.

In Step 482, after determining (in Step 480) that a repository entry, of the local configuration repository, has not been identified based on the lookup performed (in Step 468), a service request is generated. In one embodiment of the invention, the service request may represent a query for information. Further, the service request may include or may be generated using the solution hash (generated in Step 466). Following the generation of the service request, in Step 484, the service request is transmitted to the solution integration service (SIS) (see e.g., FIG. 1A) via a network and facilitated through the wireless transceiver(s) of the PSD.

In Step 486, a service response is subsequently received from the SIS. In one embodiment of the invention, the service response may represent a reply answering a corresponding service request (e.g., the service request transmitted in Step 484). Further, the service response may include a set of new repository entries—i.e., a first new repository entry and a second new repository entry. The first new repository entry may be a service configuration repository (see e.g., FIG. 1A) entry that specifies a solution hash matching the solution hash enclosed in the earlier transmitted service request. Similarly, the second new repository entry may be a service image repository (see e.g., FIG. 1A) entry that specifies a solution hash matching the solution hash enclosed in the earlier transmitted service request.

In Step 488, using the first and second new repository entries (received in Step 486), the local configuration and local image repositories are updated, respectively. Specifically, in one embodiment of the invention, the local configuration repository, on the PSD, may be updated to include the received service configuration repository entry—i.e., the first new repository entry. Meanwhile, the local image repository, on the PSD, may be updated to include the received service image repository entry—i.e., the second new repository entry. Hereinafter, the process proceeds to Step 490.

In Step 490, following either updating the local configuration and local image repositories (in Step 488) or determining that a local configuration repository entry has been identified (in Step 480), information is retrieved from the local configuration repository. In one embodiment of the invention, the aforementioned retrieved information may include a configuration identifier (ID) and a system configuration baseline (SCB). The configuration ID may refer to an arbitrary-length character string that uniquely identifies a given solution integration and user-desired host network configuration combination. The SCB may reflect the expected or required system (e.g., basic input-output system (BIOS)) settings and/or firmware inventory that should be installed across the solution node group to effect a given datacenter solution.

In Step 492, following the retrieval of the configuration ID and SCB (in Step 490), a comparison is performed between the SCB and the various SCI respective to the solution node and the other solution node(s) (identified/extracted in Step 460). Specifically, in one embodiment of the invention, a validation of the various SCI—representative of current system device behavior and interactivity detected on the solution node and the other solution node(s)—may be performed against the SCB, which reflects the expected or required system settings and/or firmware inventory to enable a desired datacenter solution. Further, a compliance or non-compliance of the various SCI, in accordance with the SCB, may be determined based on a degree of configuration drift. Configuration drifts may refer to phenomena whereby the state and/or configuration of a device (or devices) does/do not match that which is expected. The determined compliance or non-compliance of the various SCI may be referred herein as the system compliance.

In Step 494, a lookup is performed on a local image repository. In one embodiment of the invention, the local image repository may represent data storage, on the PSD, wherein various image alternatives for visualizing various solution integrations may be consolidated. The lookup may be performed using the configuration ID (retrieved in Step 490). Further, the lookup may identify a local image repository entry. Identification of the local image repository entry may entail matching the configuration ID used to perform the lookup with another configuration ID specified in the local image repository entry.

In Step 496, a configuration diagram image (CDI) is retrieved from the local image repository entry (identified in Step 494). In one embodiment of the invention, the CDI may refer to a visual representation (e.g., diagram) that depicts a variant of a baseline (i.e., expected or required) solution integration and user-desired host network configuration combination. The variant selected, from a range of possible variants (or possible CDIs) stored in the local image repository entry, may depend on and relate to the system compliance (determined in Step 492). Additional or alternative factors may sway the selection of the CDI—e.g., hardware and/or firmware inventory (e.g., whether network hardware is remote direct memory access (RDMA) capable, which if so, a CDI may be selected that reflects a converged connectivity architecture), a solution node type (e.g., rack-mounted versus modular), etc.

Thereafter, in Step 498, the CDI (retrieved in Step 496) is subsequently displayed. Specifically, in one embodiment of the invention, the CDI may be conveyed, to a user, through the graphical user interface (GUI) of the PSD (see e.g., FIG. 1B). Hereinafter, the process ends.

Figure 5:
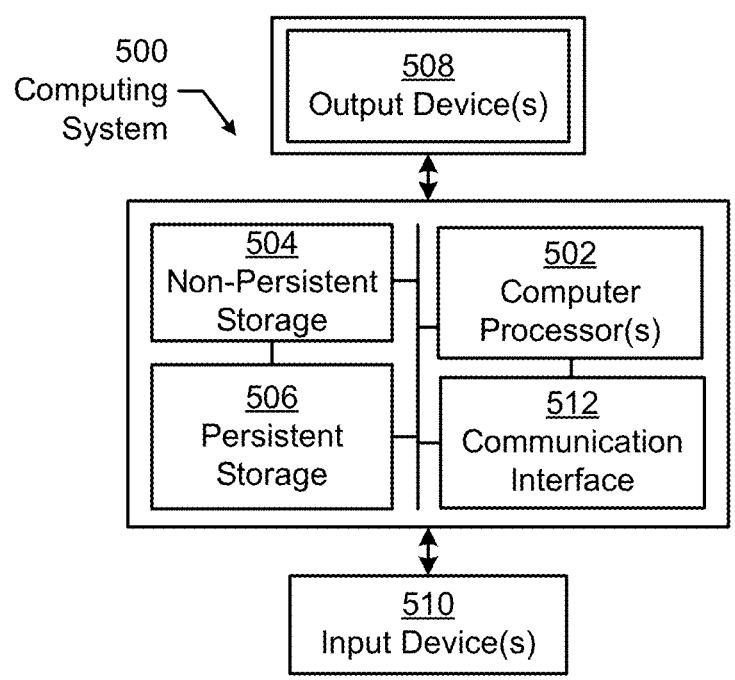
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for visualizing recommended solution integrations, comprising:
scanning a first solution node, to obtain first solution node information (SNI);
making a first determination, based on the first SNI, that the first solution node does not belong to a solution node group;
extracting, based on the first determination, first integration pertinent information (IPI) from the first SNI;
generating a first inventory hash using a first hashing function and the first IPI;
obtaining a first user-desired host network configuration;
generating a first solution hash using a second hashing function, the first inventory hash, and the first user-desired host network configuration; and
visualizing a first recommended solution integration based on the first solution hash.

2. The method of claim 1, wherein visualizing the first recommend solution integration based on the first solution hash, comprises:
making a second determination, based on the first SNI, that the first solution node lacks an operating system (OS) installed thereon;
retrieving, based on the second determination, a configuration identifier (ID) and a system configuration baseline (SCB) using the first solution hash;
extracting system configuration information (SCI) from the first SNI;
determining a system compliance using the SCI and the SCB;
retrieving a configuration diagram image (CDI) using the configuration ID and based on the system compliance; and
displaying the CDI, to visualize the first recommended solution integration.

3. The method of claim 2, wherein the system compliance reflects the SCI matching the SCB.

4. The method of claim 2, wherein the system compliance reflects the SCI mismatching the SCB.

5. The method of claim 1, wherein visualizing the first recommended solution integration based on the first solution hash, comprises:
making a second determination, based on the first SNI, that the first solution node comprises an operating system (OS) installed thereon;
retrieving, based on the second determination, a configuration identifier (ID), a system configuration baseline (SCB), and a network configuration baseline (NCB) using the first solution hash;
extracting system configuration information (SCI) and network configuration information (NCI) from the first SNI;

determining a system compliance using the SCI and the SCB, and a network compliance using the NCI and NCB;

retrieving a configuration diagram image (CDI) using the configuration ID and based on the system compliance and the network compliance; and displaying the CDI, to visualize the first recommended solution integration.

6. The method of claim 5, wherein the system compliance reflects the SCI matching the SCB, wherein the network compliance reflects the NCI matching the NCB.

7. The method of claim 5, wherein the system compliance reflects the SCI mismatching the SCB, wherein the network compliance reflects the NCI matching the NCB.

8. The method of claim 5, wherein the system compliance reflects the SCI matching the SCB, wherein the network compliance reflects the NCI mismatching the NCB.

9. The method of claim 5, wherein the system compliance reflects the SCI mismatching the SCB, wherein the network compliance reflects the NCI mismatching the NCB.

10. The method of claim 1, further comprising:
scanning a second solution node, to obtain second SNI;
making a second determination, based on the second SNI, that the second solution node belongs to the solution node group;
extracting, based on the second determination, group member information (GMI) from the second SNI;
identifying at least a third solution node using the GMI;
issuing a solution node query to the third solution node, to obtain third SNI;
extracting second IPI from the second SNI and third IPI from the third SNI;
generating a second inventory hash using the first hashing function, the second IPI, and the third IPI;
obtaining a second user-desired host network configuration;
generating a second solution hash using the second hashing function, the second inventory hash, and the second user-desired host network configuration; and
visualizing a second recommended solution integration based on the second solution hash.

11. A system, comprising:
a solution node;
a portable scanning device (PSD) operatively connected to the solution node, and comprising a computer processor; and
a solution integration labeler (SIL) executing on the computer processor, and programmed to:
scan the solution node, to obtain solution node information (SNI);
make a determination, based on the SNI, that the solution node does not belong to a solution node group;
extract, based on the determination, integration pertinent information (IPI) from the SNI;
generate an inventory hash using a first hashing function and the IPI;
obtain a user-desired host network configuration;
generate a solution hash using a second hashing function, the inventory hash, and the user-desired host network configuration; and
visualize a recommended solution integration based on the solution hash.

12. The system of claim 11, further comprising:
a mobile application comprising the SIL and a graphical user interface (GUI),
wherein the recommended solution integration is visualized through the mobile application using the GUI.

13. The system of claim 11, wherein the PSD further comprises a near-field communications (NFC) transceiver used to scan the solution node.

14. The system of claim 11, wherein the PSD further comprises a local cache, wherein the SIL is further programmed to visualize the recommended solution integration using a configuration diagram image (CDI) retrieved from the local cache based on the solution hash.

15. The system of claim 11, further comprising:
a solution integration service (SIS) operatively connected to the PSD,
wherein the SIL is further programmed to visualize the recommended solution integration using a configuration diagram image (CDI) retrieved from the SIS based on the solution hash.

16. The system of claim 11, wherein the solution node is a bare-metal server.

17. A non-transitory computer readable medium (CRM) comprising computer readable program code, which when executed by a computer processor, enables the computer processor to:
scan a first solution node, to obtain first solution node information (SNI);
make a first determination, based on the first SNI, that the first solution node does not belong to a solution node group;
extract, based on the first determination, first integration pertinent information (IPI) from the first SNI;
generate a first inventory hash using a first hashing function and the first IPI;
obtain a first user-desired host network configuration;
generate a first solution hash using a second hashing function, the first inventory hash, and the first user-desired host network configuration; and
visualize a first recommended solution integration based on the first solution hash.

18. The non-transitory CRM of claim 17, wherein to visualize the first recommend solution integration based on the first solution hash, the computer readable program code enables the computer processor to:
make a second determination, based on the first SNI, that the first solution node lacks an operating system (OS) installed thereon;
retrieve, based on the second determination, a configuration identifier (ID) and a system configuration baseline (SCB) using the first solution hash;
extract system configuration information (SCI) from the first SNI;
determine a system compliance using the SCI and the SCB;
retrieve a configuration diagram image (CDI) using the configuration ID and based on the system compliance; and
display the CDI, to visualize the first recommended solution integration.

19. The non-transitory CRM of claim 17, wherein to visualize the first recommended solution integration based on the first solution hash, the computer readable program code enables the computer processor to:
make a second determination, based on the first SNI, that the first solution node comprises an operating system (OS) installed thereon;
retrieve, based on the second determination, a configuration identifier (ID), a system configuration baseline (SCB), and a network configuration baseline (NCB) using the first solution hash;

extract system configuration information (SCI) and network configuration information (NCI) from the first SNI;

determine a system compliance using the SCI and the SCB, and a network compliance using the NCI and NCB;

retrieve a configuration diagram image (CDI) using the configuration ID and based on the system compliance and the network compliance; and display the CDI, to visualize the first recommended solution integration.

20. The non-transitory CRM of claim 17, further comprising computer readable program code, which when executed by the computer processor, enables the computer processor to:

scan a second solution node, to obtain second SNI;

make a second determination, based on the second SNI, that the second solution node belongs to the solution node group;

extract, based on the second determination, group member information (GMI) from the second SNI;

identify at least a third solution node using the GMI;

issue a solution node query to the third solution node, to obtain third SNI;

extract second IPI from the second SNI and third IPI from the third SNI;

generate a second inventory hash using the first hashing function, the second IPI, and the third IPI;

obtain a second user-desired host network configuration;

generate a second solution hash using the second hashing function, the second inventory hash, and the second user-desired host network configuration; and visualize a second recommended solution integration based on the second solution hash.

\* \* \* \* \*